(12) United States Patent
Russell

(10) Patent No.: US 10,754,350 B2
(45) Date of Patent: Aug. 25, 2020

(54) SENSOR TRAJECTORY PLANNING FOR A VEHICLE

(71) Applicant: X Development LLC, Mountain View, CA (US)

(72) Inventor: Jared Russell, San Francisco, CA (US)

(73) Assignee: X Development LLC, Mountain View, CA (US)

(*) Notice: Subject to any disclaimer, the term of this patent is extended or adjusted under 35 U.S.C. 154(b) by 398 days.

(21) Appl. No.: 15/838,437

(22) Filed: Dec. 12, 2017

(65) Prior Publication Data

US 2018/0113468 A1  Apr. 26, 2018

Related U.S. Application Data

(63) Continuation of application No. 15/178,120, filed on Jun. 9, 2016, now Pat. No. 9,880,561.

(51) Int. Cl.
*G05D 1/02* (2020.01)
*B25J 9/16* (2006.01)
(Continued)

(52) U.S. Cl.
CPC ............ *G05D 1/0251* (2013.01); *B25J 9/162* (2013.01); *G05D 1/0094* (2013.01);
(Continued)

(58) Field of Classification Search
CPC ..... B25J 9/162; G06Q 50/28; G06K 2209/19; G06K 9/00664; G06K 9/00805;
(Continued)

(56) References Cited

U.S. PATENT DOCUMENTS

| 5,170,352 A | 12/1992 | McTamaney et al. |
| 9,098,753 B1 | 8/2015 | Zhu et al. |

(Continued)

FOREIGN PATENT DOCUMENTS

| EP | 1913235 | 4/2011 |
| GB | 2522327 | 7/2015 |

(Continued)

OTHER PUBLICATIONS

International Searching Authority, International Search Report and the Written Opinion of the International Searching Authority dated Aug. 16, 2017, issued in connection with International Application No. PCT/US2017/033152, filed on May 17, 2017, 9 pages.

*Primary Examiner* — Atul Trivedi
(74) *Attorney, Agent, or Firm* — McDonnell Boehnen Hulbert & Berghoff LLP

(57) ABSTRACT

An example system includes a vehicle and a sensor connected to the vehicle. The system may receive a predetermined path for the vehicle to follow. The system may also receive a plurality of objectives, associated with a corresponding set of sensor data, for which to collect sensor data. The system may determine, for each of the plurality of objectives, a portion of the environment for the sensor to scan to acquire the corresponding set of sensor data. The system may determine, based on the portion of the environment determined for each of the plurality of objectives, a sensor trajectory through which to move the sensor. The system may cause the sensor to move through the determined sensor trajectory and scan portions of the environment corresponding to the determined sensor trajectory as the vehicle moves along the predetermined path.

20 Claims, 10 Drawing Sheets

(51) Int. Cl.
*G06K 9/00* (2006.01)
*G05D 1/00* (2006.01)
*G06K 9/20* (2006.01)
*G06Q 50/28* (2012.01)

(52) U.S. Cl.
CPC ......... *G05D 1/0242* (2013.01); *G05D 1/0246* (2013.01); *G05D 1/0257* (2013.01); *G05D 1/0297* (2013.01); *G06K 9/00664* (2013.01); *G06K 9/00805* (2013.01); *G06K 9/209* (2013.01); *G06Q 50/28* (2013.01); *G05D 2201/0207* (2013.01); *G05D 2201/0216* (2013.01); *G06K 2209/19* (2013.01)

(58) Field of Classification Search
CPC .... G06K 9/209; G05D 1/0094; G05D 1/0242; G05D 1/0246; G05D 1/0251; G05D 1/0257; G05D 1/0297; G05D 2201/0207; G05D 2201/0216
USPC .......................................................... 701/25
See application file for complete search history.

(56) References Cited

U.S. PATENT DOCUMENTS

| | | | |
|---|---|---|---|
| 9,170,116 B1 | 10/2015 | Joshi et al. | |
| 9,251,698 B2 | 2/2016 | Vian et al. | |
| 9,427,189 B2* | 8/2016 | Proud .................. | A61B 5/443 |
| 2009/0062936 A1 | 3/2009 | Nguyen et al. | |
| 2010/0321235 A1* | 12/2010 | Vossiek ............... | G01S 13/9089 |
| | | | 342/25 A |
| 2011/0106339 A1* | 5/2011 | Phillips ................. | G01C 21/20 |
| | | | 701/2 |
| 2011/0222745 A1* | 9/2011 | Osterhout ............. | G06Q 30/02 |
| | | | 382/118 |
| 2012/0062743 A1* | 3/2012 | Lynam ............... | H04N 5/23293 |
| | | | 348/148 |
| 2013/0222115 A1* | 8/2013 | Davoodi ................. | H04Q 9/00 |
| | | | 340/10.1 |
| 2013/0321627 A1* | 12/2013 | Turn, Jr. ............. | G06K 9/00805 |
| | | | 348/148 |
| 2014/0277691 A1 | 9/2014 | Jacobus et al. | |
| 2015/0029332 A1 | 1/2015 | Milstead | |
| 2015/0345907 A1* | 12/2015 | Varga ...................... | F41G 3/147 |
| | | | 89/41.05 |
| 2015/0356285 A1* | 12/2015 | Glaser ................ | G06K 9/00906 |
| | | | 726/7 |
| 2016/0016311 A1 | 1/2016 | Konolige et al. | |
| 2016/0132059 A1 | 5/2016 | Mason et al. | |
| 2016/0132705 A1* | 5/2016 | Kovarik ................ | G06K 7/10376 |
| | | | 340/10.3 |
| 2017/0008521 A1* | 1/2017 | Braunstein ......... | G01C 21/3407 |
| 2017/0022015 A1 | 1/2017 | Gollu | |
| 2017/0205826 A1 | 7/2017 | Smith et al. | |
| 2017/0357270 A1* | 12/2017 | Russell ................. | G05D 1/0257 |
| 2018/0017679 A1* | 1/2018 | Valouch ................. | G01S 7/4816 |
| 2018/0372875 A1* | 12/2018 | Juelsgaard ............. | G01S 17/86 |
| 2019/0086539 A1* | 3/2019 | Shin ...................... | G01S 7/4817 |
| 2019/0172964 A1* | 6/2019 | Hermes .................. | G01S 17/46 |
| 2019/0271767 A1* | 9/2019 | Keilaf .................... | G01S 7/489 |
| 2019/0324444 A1* | 10/2019 | Cella ..................... | H04L 1/0002 |
| 2019/0339688 A1* | 11/2019 | Cella ..................... | G06N 20/00 |
| 2020/0064483 A1* | 2/2020 | Li .......................... | G01S 13/931 |

FOREIGN PATENT DOCUMENTS

| | | |
|---|---|---|
| JP | 2012247400 | 12/2012 |
| JP | 2014237188 | 12/2014 |
| JP | 2015230729 | 12/2015 |
| KR | 10-2016-0057668 | 5/2016 |
| WO | WO2012167301 | 12/2012 |
| WO | 2016053438 | 4/2016 |

* cited by examiner

SENSOR TRAJECTORY PLANNING FOR A VEHICLE

CROSS REFERENCE TO RELATED APPLICATION

The present application claims priority to U.S. patent application Ser. No. 15/178,120 filed on Jun. 9, 2016 and entitled "Sensor Trajectory Planning for a Vehicle," which is herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes, forklifts, and pallet jacks. Human operators may be employed to operate machines, vehicles, and other equipment. In some cases, one or more of the machines or vehicles may be robotic devices guided by computer control systems.

SUMMARY

An autonomous or semiautonomous vehicle may have a sensor connected thereto. The sensor may be a vision sensor with a limited field of view such as, for example, a stereo camera. A control system of the vehicle may receive, from a global planning system, a predetermined path for the vehicle to follow in order to accomplish task within an environment. Alternatively, the control system may determine the predetermined path for the vehicle to follow. The control system may also receive and/or determine a plurality of objectives for which to collect sensor data as the vehicle moves along the predetermined path. Each of the plurality of objectives may be associated with a corresponding set of sensor data. In order to acquire the corresponding sets of sensor data, the control system may determine portions of the environment for the sensor to scan. Based on the determined portions of the environment, the control system may determine a sensor trajectory through which to move the sensor while the vehicle moves along the predetermined path. Moving the sensor along the determined sensor trajectory may place the determined portions of the environment within the field of view of the sensor as the vehicle moves along the predetermined path. Further, the control system may provide instructions to cause the sensor to move through the determined sensor trajectory.

In one example, a system is provided including a vehicle and a sensor connected to the vehicle. The sensor may be configured to move with respect to the vehicle to control a portion of an environment observable by the sensor. The system may include a control system configured to receive a predetermined path for the vehicle to follow. The control system may also be configured to receive a plurality of objectives for which to collect sensor data as the vehicle moves along the predetermined path. Each of the plurality of objectives may be associated with a corresponding set of sensor data. The control system may additionally be configured to determine, for each of the plurality of objectives, at least one portion of the environment for the sensor to scan to acquire the corresponding set of sensor data. The control system may further be configured to determine, based on the at least one portion of the environment determined for each of the plurality of objectives, a sensor trajectory through which to move the sensor while the vehicle moves along the predetermined path. Yet further, the control system may be configured to provide instructions to cause the sensor to move through the determined sensor trajectory and scan portions of the environment corresponding to the determined sensor trajectory as the vehicle moves along the predetermined path.

In another example, a method is provided including receiving a predetermined path for a vehicle to follow. The method also includes receiving a plurality of objectives for which to collect sensor data from a sensor connected to the vehicle as the vehicle moves along the predetermined path. Each of the plurality of objectives may be associated with a corresponding set of sensor data. The sensor may be configured to move with respect to the vehicle to control a portion of an environment visible to the sensor. The method additionally includes determining, for each of the plurality of objectives, at least one portion of the environment for the sensor to scan to acquire the corresponding set of sensor data. Further, the method includes determining, based on the at least one portion of the environment determined for each of the plurality of objectives, a sensor trajectory through which to move the sensor while the vehicle moves along the predetermined path. Yet further, the method includes causing the sensor to move through the determined sensor trajectory and scan portions of the environment corresponding to the determined sensor trajectory as the vehicle moves along the predetermined path.

In an additional example, a non-transitory computer readable medium is provided having stored thereon instructions that, when executed by a computing device, cause the computing device to perform operations. The operations include receiving a predetermined path for a vehicle to follow. The operations also include receiving a plurality of objectives for which to collect sensor data from a sensor connected to the vehicle as the vehicle moves along the predetermined path. Each of the plurality of objectives may be associated with a corresponding set of sensor data. The sensor may be configured to move with respect to the vehicle to control a portion of an environment visible to the sensor. The operations additionally include determining, for each of the plurality of objectives, at least one portion of the environment for the sensor to scan to acquire the corresponding set of sensor data. Further, the operations include determining, based on the at least one portion of the environment determined for each of the plurality of objectives, a sensor trajectory through which to move the sensor while the vehicle moves along the predetermined path. Yet further, the operations include causing the sensor to move through the determined sensor trajectory and scan portions of the environment corresponding to the determined sensor trajectory as the vehicle moves along the predetermined path.

In a further example, a system is provided including a vehicle means and a sensing means connected to the vehicle means. The sensing means may be configured to move with respect to the vehicle means to control a portion of an environment observable by the sensing means. The system may include a control means configured to receive a predetermined path for the vehicle to follow. The control means may also be configured to receive a plurality of objectives for which to collect data from the sensing means as the vehicle moves along the predetermined path. Each of the plurality of objectives may be associated with a corresponding set of data from the sensing means. The control means may additionally be configured to determine, for each of the plurality of objectives, at least one portion of the environment for the sensing means to scan to acquire the corresponding set of sensor data. The control means may further be configured to determine, based on the at least one portion of the environment determined for each of the plurality of objectives, a sensing means trajectory through which to move the sensing means while the vehicle means moves along the predetermined path. Yet further, the control means may be configured to provide instructions to cause the sensing means to move through the determined sensing means trajectory and scan portions of the environment corresponding to the determined sensing means trajectory as the vehicle means moves along the predetermined path.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
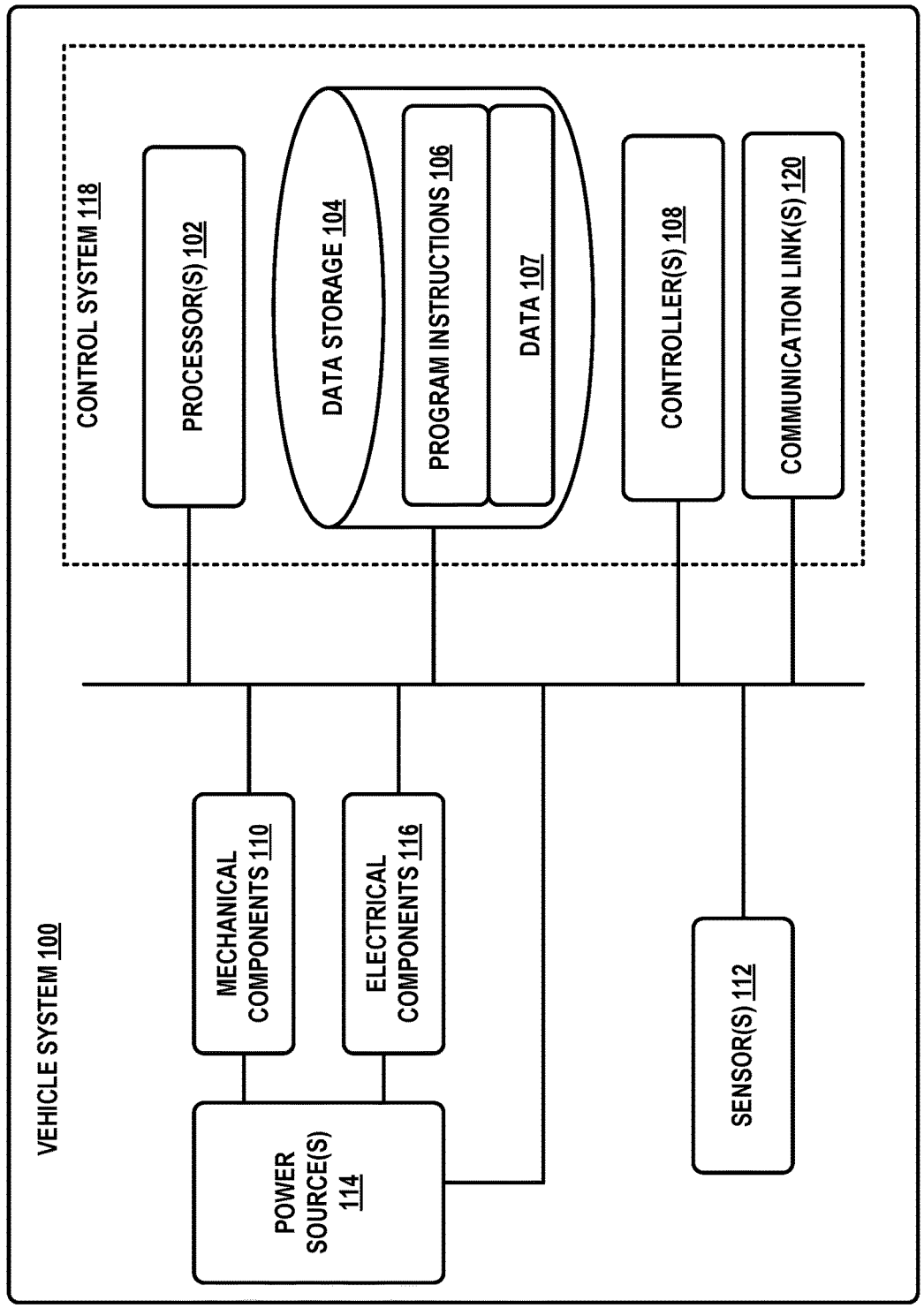
FIG. 1 illustrates a block diagram of a vehicle system, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

An autonomous or semi-autonomous vehicle may be configured to move through an environment in order to accomplish different tasks within the environment. The different tasks may depend on the type of vehicle as well as the environment in which the vehicle is working. For example, the vehicle may be a forklift (e.g., fork truck) or a pallet jack working within a warehouse environment. Accordingly, the different tasks may include moving boxes, moving pallets of boxes or other objects, loading/unloading trucks, and/or loading/unloading storage shelves.

The vehicle may be equipped with a sensor such as a camera, stereo camera, depth sensor, LIDAR, Radar, and/or infrared sensor, among other possibilities. The sensor may have a limited field of view. Consequently, the sensor may be connected to the vehicle through a pan-head, one or more rotational joints, and/or one or more translational motion mechanisms to allow the sensor to rotate and/or translate with respect to the vehicle to control a portion of the environment within the field of view of the sensor. The vehicle may receive or determine a predetermined path for the vehicle to follow through a portion of the environment. For example, a global planning system configured to synchronize operations of multiple vehicles may provide the vehicle with the predetermined path. The vehicle may determine or modify the path based on sensor data, and/or a task or operation commanded to the vehicle.

As the vehicle moves along the predetermined path, the sensor may be used to collect sensor data for a plurality of objectives. The objectives may include obstacle detection along a path the vehicle is expected to travel on, detection of obstacles in areas of the environment the vehicle is expected or planned to place objects in, detection of landmarks within the environment to determine or verify a location of the vehicle within the environment, and/or detection of objects of interest (e.g., boxes, pallets) within the environment. Other examples of objectives may be possible and may vary based on the type of vehicle and the type of environment the vehicle is operating in or expected to operate in. For example, an operation for a vehicle configured to operate on public roads may include identifying lanes on the road, identifying pedestrians, and/or identifying other vehicles. The objectives may be received from the global planning system or may be determined by the vehicle. In some examples, the objectives may be static in that the vehicle may at all times use the sensor to collect sensor data for the same set of objectives. In other examples, the objectives may be dynamic. For example, the objectives may be periodically updated or modified based on a task or operation currently performed by or expected to be performed by the vehicle.

Using one sensor (or less than one sensor per objective of the plurality of objectives) to collect sensor data for the plurality of objectives may be less expensive and more efficient than using one or more sensors per objective. A vehicle system with fewer sensors may be less expensive to manufacture, easier to program, and easier to operate. Aside from fewer sensors, the vehicle system may include fewer hardware components for receiving and processing the sensor data. Additionally, a smaller number of sensors (e.g., one sensor) may increase the utilization of the sensors in comparison to a system having one or more sensors dedicated for each of the plurality of objectives. For example, when a particular objective of the plurality of objectives (e.g., pallet detection) is not actively being pursued (e.g., data for pallet detection is not being collected), the sensor dedicated to the particular objective may be idle and thus an underutilized resource. In contrast, a vehicle system with only one sensor might constantly be utilizing the sensor for at least one objective such as obstacle detection.

Each of the plurality of objectives may have associated therewith or determined therefor portions of the environment for the sensor to scan in order to acquire the sensor data corresponding to a respective objective. For example, in order to detect obstacles, the sensor may scan portions of the environment in front of the vehicle or portions of the environment along the predetermined path the vehicle is following or expected to follow. The portions of the environment associated with each of the plurality of objectives may be determined based on an expected position of an object within the environment. For example, when traversing an aisle of a warehouse, objects of interest (e.g., boxes, pallets) may be expected to be located on either side of the vehicle on shelves/racks making up the aisle.

Based on the portions of the environment associated with each of the plurality of objectives, the control system of the vehicle may determine a sensor trajectory through which to move the sensor as the vehicle moves along the predetermined path. The control system may further provide instructions to cause the sensor to move through the determined sensor trajectory and scan portions of the environment along the sensor trajectory. The sensor trajectory may include an angular position trajectory and a velocity profile corresponding to the angular position trajectory. Scanning the portions of the environment along the sensor trajectory may provide the control system with at least a portion of the sensor data associated with each of the plurality of objectives. In some examples, scanning the portions of the environment along the sensor trajectory may include scanning each of the portions of the environment associated with the plurality of objectives. In other examples, only some of the portions of the environment associated with the plurality of objectives may be scanned.

In one embodiment, the control system may determine to adjust one or more sensor performance parameters as the sensor moves along the determined sensor trajectory. The sensor performance parameters may include a level of zoom/magnification, frame rate, resolution, image exposure, white balance, and/or gain, among a number of other possible sensor parameters. The one or more sensor performance parameters may be adjusted/determined for each frame of sensor data captured by the sensor along the determined sensor trajectory. In some embodiments, the control system may determine the sensor trajectory based on the one or more sensor performance parameters. For example, a particular portion of the environment may need to be scanned with a high level of magnification to capture a detailed representation of a particular object. Accordingly, a sensor trajectory may be determined that provides sufficient time to adjust the level of magnification of the sensor before the sensor pans over the particular portion of the environment containing the particular object.

In another embodiment, each of the plurality of objectives may be associated with a corresponding priority level. In determining the sensor trajectory, the control system may prioritize objectives with a high priority level over objectives with a low priority level. Objectives with a high priority level may be associated with scanning portions of the environment necessary to allow the vehicle to proceed safely along the predetermined path. For example, obstacle detection may be a high priority objective in that failure to detect obstacles along the predetermined path may lead to a collision of the vehicle with features of the environment, objects within the environment, or other vehicles, thus impeding or halting operation of the vehicle. In contrast, detection of objects of interest may be a low priority task in that failure to detect an object of interest for the vehicle to operate on might not pose a risk of damaging the vehicle. However, failing to detect objects to operate on may nevertheless be undesirable due to a time delay associated with having to perform additional scans to locate new objects to operate on.

In some embodiments, the sensor trajectory may indicate to scan all portions of the environment corresponding to high priority tasks but only some of the portions of the environment corresponding to low priority tasks. For example, portions of the environment corresponding to low priority tasks might be scanned after all portions of the environment corresponding to high priority tasks have been scanned. In another example, overlap between portions of the environment corresponding to low priority tasks and portions of the environment corresponding to high priority tasks may allow for simultaneous acquisition of data corresponding to high priority and low priority tasks. The one or more sensor performance parameters may be adjusted/determined for each frame of sensor data captured by the sensor along the determined sensor trajectory based on the priority levels associated with the plurality of objectives. For example, portions of the environment corresponding to high priority tasks may be scanned with high resolution whereas portions of the environment corresponding to low priority tasks may be scanned with low resolution.

In other embodiments, the control system may determine a cost associated with scanning the portions of the environment corresponding to each of the plurality of objectives. The cost may be based on respective positions of the portions of the environment within the environment and/or respective positions of the portions of the environment relative to a current position or expected future position of the sensor. For example, obstacle detection may comprise scanning an area of the environment along the predetermined path. Scanning the area of the environment along the predetermined path may involve minimal motion of the sensor (e.g., scanning an area directly in front of the vehicle may require minimal sensor panning). In contrast, object detection (e.g., box, pallet) may comprise scanning areas to the left and to the right of the vehicle. Accordingly, panning the sensor to scan areas to the left and to the right of the vehicle may involve increased motion of the sensor relative to scanning an area directly in front of the vehicle. Consequently, object detection may be associated with a higher time and power cost to pan the sensor to scan corresponding portions of the environment.

Similarly, the cost associated with scanning the portions of the environment may be based on one or more sensor performance parameters (e.g., magnification level, frame rate, image exposure, gain, etc.) associated with or determined for portions of the environment corresponding to each of the plurality of objectives. For example, zooming in to capture a more detailed scan of a particular portion of the environment may be associated with a time cost of adjusting the level of zoom of the sensor as well as an opportunity cost of scanning a lesser extent of the environment (e.g., the higher zoom level may correspond to a smaller extent of the field of view of the sensor).

The control system may determine an overall cost function for the plurality of objectives based on the cost associated with each of the plurality of objectives. The overall cost function may include a time cost, a power cost, and/or a scan resolution cost, among other possible resource costs. The control system may determine a sensor trajectory that minimizes the overall cost function. For example, minimizing the overall cost function may comprise modifying an ordering in which the portions of the environment corresponding to the sensor trajectory are scanned to produce a sequential scanning of adjacent portions of the environment that avoids repeated directional changes of the panning motion of the sensor.

In one embodiment, operations for determining the sensor trajectory may include determining a plurality of candidate sensor trajectories between a sensor position at a start of the predetermined path (e.g., a current sensor position) and a plurality of candidate sensor positions at the end of the predetermined path. The plurality of candidate sensor trajectories may be determined by discretizing the predetermined path into a plurality of time points. For each time point, a plurality of candidate angular positions that the sensor can be moved to, given a maximum rotational velocity of the sensor and an angular position of the sensor at a prior time point, may be determined. A plurality of sequences of the candidate angular positions may be determined between a time point corresponding to a start of the predetermined path and an end of the predetermined path. The plurality of candidate sensor trajectories may include the plurality of sequences of the candidate angular positions.

The operations may further include determining, for each respective candidate sensor trajectory of the candidate sensor trajectories, a set of portions of the environment observable by the sensor along the respective sensor trajectory. A particular sensor trajectory may be selected from the plurality of candidate sensor trajectories by selecting a candidate sensor trajectory associated with a set of portions of the environment that most closely matches the portions of the environment associated with the plurality of objectives. In one example, a sensor trajectory may be selected that maximizes the number of distinct features within the environment observable to the sensor. In another example, a sensor trajectory may be selected that maximizes a number of high priority portions of the environment observable to the sensor.

The operations may yet further include determining and/or adjusting one or more sensor parameters for the sensor. The sensor parameters may include a level of zoom/magnification of the sensor, a frame rate of the sensor, a resolution of scans performed by the sensor, an image exposure, white balance, and/or gain level of the sensor, among other possible parameters. In one example, one or more sensor parameters may be determined after determining the sensor trajectory through which to move the sensor. Specifically, the one or more sensor parameters may be determined for each portion of the environment observable by the sensor along the determined/selected sensor trajectory.

In another example, one or more candidate sensor parameters may be determined for each candidate sensor trajectory of the plurality of candidate sensor trajectories. Selection of a particular sensor trajectory from the plurality of candidate sensor trajectories may be based on the determined candidate sensor parameters corresponding to each candidate sensor trajectory. Specifically, candidate sensor parameters may be determined for each candidate angular position of the plurality of candidate angular positions that the sensor can be moved to as the sensor moves along a particular candidate sensor trajectory. Thus, a sensor trajectory may be selected that allows the sensor to scan portions of the environment associated with the plurality of objectives as well as improves and/or optimizes the quality with which each portion of the environment is scanned. The control system of the vehicle may, based on the one or more determined sensor parameters, provide instructions to set or adjust parameters of the sensor as the sensor moves through the determined sensor trajectory and scans portions of the environment corresponding to the determined sensor trajectory.

In a further example, the one or more sensor parameters may be updated as the sensor scans portions of the environment along the determined sensor trajectory. For example, a frame rate of the sensor may be sufficient to capture multiple data/image frames of each portion of the environment. The sensor may initially scan a particular portion of the environment with the one or more determined sensor parameters (e.g., the initial parameters). Each data/image frame may be analyzed to determine whether the acquired data is sufficient to carry out a corresponding operation (e.g., recognize a fiducial tag). Based on the analysis, one or more updates to the sensor parameters may be determined to improve a quality of subsequent scans of the particular portion of the environment (e.g., the control system may implement a feedback system). The one or more updates to the sensor parameters may increase a probability of the subsequent scans providing data sufficient to carry out the corresponding operation.

In another embodiment, a sensor reference frame may be determined at each time point of a plurality of time points along the predetermined path. As the vehicle moves along the predetermined path, the pose of the sensor with respect to the environment may change due to motion of the vehicle even when the sensor is not actively actuated. This changing pose may be used as the sensor reference frame. Determining the sensor trajectory may comprise determining, for each time point of the plurality of time points, how to reorient the sensor at a particular time point with respect to the sensor reference frame corresponding to the particular time point. For example, if the vehicle is planned to turn right at a specific time point, the sensor position might not need to be adjusted in order to point the sensor at a portion of the environment to the right of the portion of the environment observable by the sensor at a time point prior to the specific time point. Consequently, motion of the sensor needed to scan the portions of the environment corresponding to the plurality of objectives may be reduced or minimized.

In general, selecting a sensor trajectory from the plurality of candidate sensor trajectories may be based on an objective function indicative of parameters associated with the plurality of objectives. The parameters may include a number of distinct features (e.g., objects, landmarks) observable along the sensor trajectory, a number of distinct portions of the environment observable along the sensor trajectory, a scan quality corresponding to portions of the sensor trajectory (e.g., magnification, resolutions, exposure, white balance, gain, etc.), and/or a speed with which the sensor trajectory can cover the portions of the environment associated with each of the plurality of objectives, among other possibilities. A sensor trajectory may be selected that maximizes the objective function and/or any parameters thereof. The objective function may be provided by the global planning system, determined by the vehicle, and/or specified by a user/operator of the vehicle.

II. EXAMPLE ROBOTIC VEHICLE SYSTEM

FIG. 1 illustrates an example configuration of a vehicle system that may be used in connection with the embodiments described herein. The vehicle system 100 may be configured to operate autonomously, semi-autonomously, and/or using directions provided by user(s). The vehicle system 100 may be implemented in various forms, such as forklifts, pallet jacks, cars, trucks, motorcycles, buses, boats, airplanes, helicopters, lawn mowers, earth movers, boats, snowmobiles, aircraft, recreational vehicles, amusement park vehicles, farm equipment, construction equipment, warehouse equipment, trams, golf carts, trains, and trolleys. Other forms are possible as well. Furthermore, the vehicle system 100 may also be referred to as a robot, robotic device, mobile robot, or robotic vehicle, among other designations.

As shown in FIG. 1, the vehicle system 100 may include processor(s) 102, data storage 104, and controller(s) 108, which together may be part of a control system 118. The vehicle system 100 may also include sensor(s) 112, power source(s) 114, mechanical components 110, electrical components 116, and communication link(s) 120. Nonetheless, the vehicle system 100 is shown for illustrative purposes, and may include more or fewer components. The various components of vehicle system 100 may be connected in any manner, including wired or wireless connections. Further, in some examples, components of the vehicle system 100 may be distributed among multiple physical entities rather than a single physical entity. Other example illustrations of vehicle system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the vehicle system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the vehicle system 100. In some embodiments, the controller 108 may be a purpose-built embedded device for performing specific operations with one or more subsystems of the vehicle system 100.

The control system 118 may monitor and physically change the operating conditions of the vehicle system 100. In doing so, the control system 118 may serve as a link between portions of the vehicle system 100, such as between mechanical components 110 and/or electrical components 116. In some instances, the control system 118 may serve as an interface between the vehicle system 100 and another computing device. Further, the control system 118 may serve as an interface between the vehicle system 100 and a user. For instance, the control system 118 may include various components for communicating with the vehicle system 100, including a joystick, buttons, and/or ports, etc. The example interfaces and communications noted above may be implemented via a wired or wireless connection, or both. The control system 118 may perform other operations for the vehicle system 100 as well.

In some implementations, the control system 118 of vehicle system 100 may also include communication link(s) 120 configured to send and/or receive information. The communication link(s) 120 may transmit data indicating the state of the various components of the vehicle system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the vehicle system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g. the operational state of one or more of the components of the vehicle system 100). The processor(s) 102 may subsequently transmit the particular piece of information back out the communication link(s) 120.

In some cases, the communication link(s) 120 may include a wired connection. The vehicle system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the vehicle system 100 via wired or wireless connections, and may further be configured to communicate with one or more users or operators of the vehicle. As one possible illustration, the control system 118 may receive an input (e.g., from a user or from another vehicle) indicating an instruction to move a pallet from a first location of a warehouse to a second location of the warehouse. The input to control system 118 may be received via the communication link(s) 120.

Based on this input, the control system 118 may perform operations to cause the vehicle system 100 to use sensors 112 to analyze the environment of the warehouse to locate the pallet and subsequently use mechanical components 110 to pick up and move the pallet.

Operations of the control system 118 may be carried out by the processor(s) 102. Alternatively, these operations may be carried out by the controller 108, or a combination of the processor(s) 102 and the controller 108. In some embodiments, the control system 118 may wholly or partially reside on a device other than the vehicle system 100, and therefore may at least in part control the vehicle system 100 remotely. Communication link(s) 120 may be used at least in part to carry out the remote communication.

Mechanical components 110 represent hardware of the vehicle system 100 that may enable the vehicle system 100 to perform physical operations. As a few examples, the vehicle system 100 may include physical members such robotic arm(s), wheel(s), track(s), linkage(s), and/or end effector(s). The physical members or other parts of vehicle system 100 may further include motors and actuators arranged to move the physical members in relation to one another. The vehicle system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The vehicle system 100 may be configured to add and/or remove such removable components, which may involve assistance from a user and/or another robot. For example, the vehicle system 100 may be configured with removable arms, linkages, and/or end effectors so that these members can be replaced or changed as needed or desired based on a task the vehicle 100 is expected or planned to perform. In some embodiments, the vehicle system 100 may include one or more removable and/or replaceable battery units or sensors. Other types of removable components may be included within some embodiments.

The vehicle system 100 may include sensor(s) 112 arranged to sense aspects of the vehicle system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, the vehicle system 100 may be configured to receive sensor data from sensors that are physically separated from the robot (e.g., sensors that are positioned on other robots or located within the environment in which the robot is operating). In some embodiments, some of the sensor(s) 112 may have a limited field of view.

The sensor(s) 112 may provide sensor data to the processor(s) 102 (perhaps by way of data 107) to allow for interaction of the vehicle system 100 with its environment, as well as monitoring of the operation of the vehicle system 100. The sensor data may be used in evaluation of various factors for activation, movement, and deactivation of mechanical components 110 and electrical components 116 by control system 118. For example, the sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the vehicle system 100 is operating. The sensor(s) 112 may monitor the environment in real time, and detect obstacles, elements of the terrain, weather conditions, temperature, and/or other aspects of the environment.

Further, the vehicle system 100 may include sensor(s) 112 configured to receive information indicative of the state of the vehicle system 100, including sensor(s) 112 that may monitor the state of the various components of the vehicle system 100. The sensor(s) 112 may measure activity of systems of the vehicle system 100 and receive information based on the operation of the various features of the vehicle system 100, such the operation of wheels, linkages, actuators, end effectors, and/or other mechanical and/or electrical features of the vehicle system 100. The data provided by the sensor(s) 112 may enable the control system 118 to determine errors in operation as well as monitor overall operation of components of the vehicle system 100.

As an example, the vehicle system 100 may use a stereo camera to scan portions of the environment to detect obstacles along a planned path of the vehicle, identify environmental landmarks within an environment of the vehicle 100, and locate objects of interest, such as pallets and boxes. The stereo camera may have a limited field of view. Mechanical components 110 and electrical components 116 may work in coordination to move the stereo camera along a trajectory to direct a field of view of the stereo camera at different portions of the environment.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the vehicle system 100 based on the location of the IMU in the vehicle system 100 and the kinematics of the vehicle system 100.

The vehicle system 100 may include other types of sensors not explicated discussed herein. Additionally or alternatively, the vehicle system 100 may use particular sensors for purposes not enumerated herein.

The vehicle system 100 may also include one or more power source(s) 114 configured to supply power to various components of the vehicle system 100. Among other possible power systems, the vehicle system 100 may include a hydraulic system, electrical system, batteries, and/or other types of power systems. As an example illustration, the vehicle system 100 may include one or more batteries configured to provide charge to components of the vehicle system 100. Some of the mechanical components 110 and/or electrical components 116 may each connect to a different power source, may be powered by the same power source, or be powered by multiple power sources.

Any type of power source may be used to power the vehicle system 100, such as electrical power or a gasoline engine. Additionally or alternatively, the vehicle system 100 may include a hydraulic system configured to provide power to the mechanical components 110 using fluid power. Components of the vehicle system 100 may operate based on hydraulic fluid being transmitted throughout the hydraulic system to various hydraulic motors and hydraulic cylinders, for example. In one example, the hydraulic fluid may be used to actuate the forks of a forklift, fork truck, and/or pallet jack. The hydraulic system may transfer hydraulic power by way of pressurized hydraulic fluid through tubes, flexible hoses, or other links between components of the vehicle system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the vehicle system 100. The electrical components 116 may interwork with the mechanical components 110 to enable the vehicle system 100 to perform various operations. The electrical components 116 may be configured to provide power from the power source(s) 114 to the various mechanical components 110, for example. Further, the vehicle system 100 may include electric motors. Other examples of electrical components 116 may exist as well.

Although not shown in FIG. 1, the vehicle system 100 may include a chassis and/or an operator cabin, which may connect to or house components of the vehicle system 100. The structure of the chassis and/or cabin may vary within examples and may further depend on particular operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry the sensor(s) 112. These sensors may be positioned in various locations on the vehicle system 100, such as on top of the chassis to provide a high vantage point for the sensor(s) 112.

The vehicle system 100 may carry a load, such as a type of cargo that is to be transported. The load may also represent external batteries or other types of power sources (e.g., solar panels) that the vehicle system 100 may utilize. Carrying the load represents one example use for which the vehicle system 100 may be configured, but the vehicle system 100 may be configured to perform other operations as well.

III. EXAMPLE WAREHOUSE VEHICLE FLEET

Figure 2A:
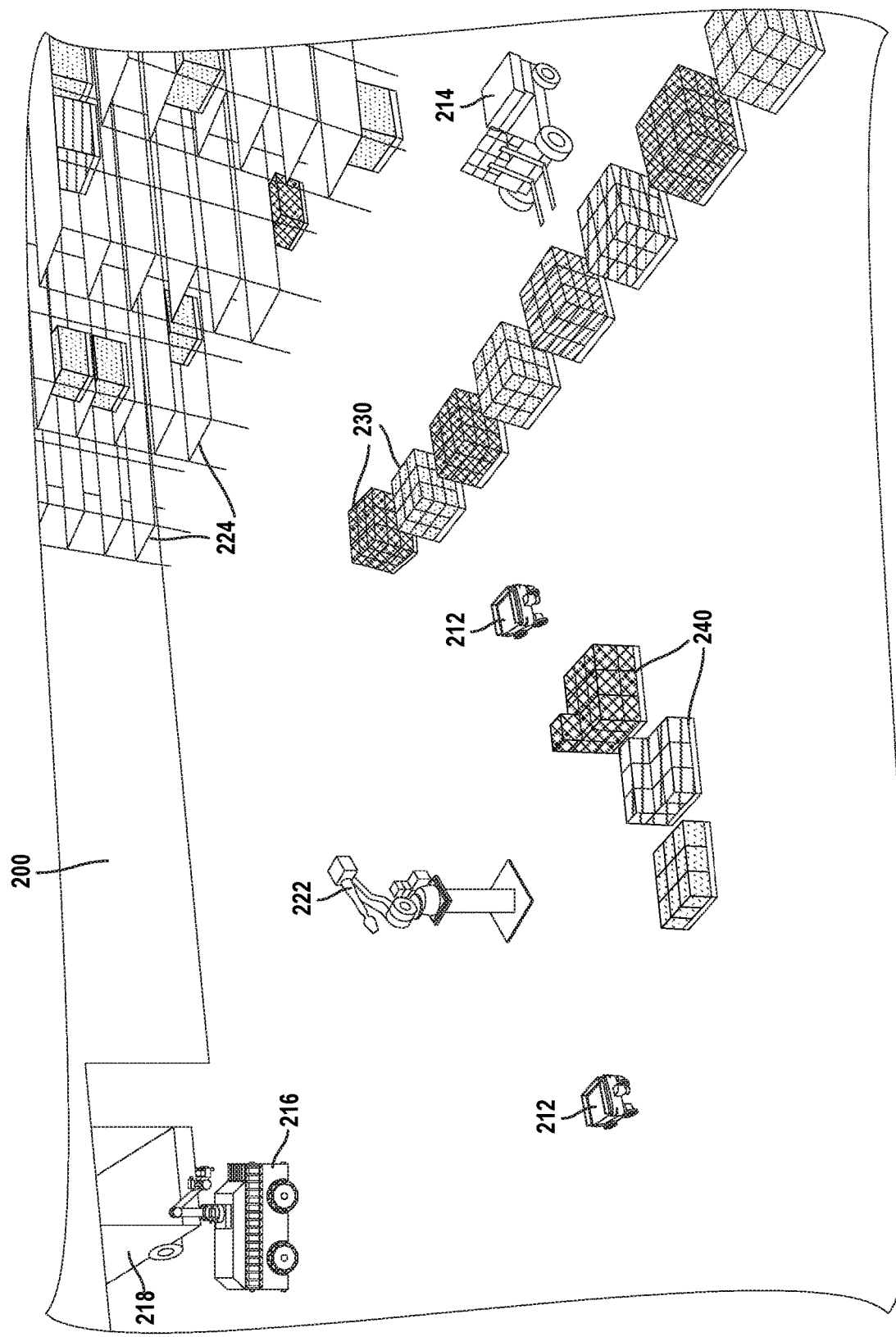
FIG. 2A illustrates a robotic fleet, according to an example embodiment.

FIG. 2A depicts a fleet of vehicles and robotic devices within a warehouse setting, according to an example embodiment. More specifically, different types of vehicles and robotic devices may form a heterogeneous robotic vehicle fleet 200 that may be controlled to collaborate to perform tasks related to the processing of items, objects, or boxes within a warehouse environment. Certain example types and numbers of different vehicles and robotic devices are shown here for illustration purposes, but robotic vehicle fleet 200 may employ more or fewer vehicles and robotic devices, may omit certain types shown here, and may also include other types of vehicles and robotic devices not explicitly shown. The operations described herein may be performed by or for any of the vehicles shown or otherwise contemplated herein. Additionally, a warehouse environment is shown here with certain types of fixed components and structures, but other types, numbers, and placements of fixed components and structures may be used in other examples as well.

One example type of vehicle shown within robotic vehicle fleet 200 is an autonomous guided vehicle (AGV) 212, which may be a relatively small, vehicle with wheels that may function to transport individual packages, cases, or totes from one location to another within the warehouse. Another example type of vehicle is an autonomous fork truck 214, a mobile device with a forklift that may be used to transport pallets of boxes and/or to lift pallets of boxes (e.g., to place the pallets onto a rack for storage). An additional example type of a robotic vehicle/device is a robotic truck loader/unloader 216, a mobile device with a robotic manipulator as well as other components such as optical sensors to facilitate loading and/or unloading boxes onto and/or off of trucks or other vehicles. For instance, robotic truck unloader 216 may be used to load boxes onto delivery truck 218, which may be parked adjacent to the warehouse. In some examples, movements of delivery truck 218 (e.g., to deliver packages to another warehouse) may also be coordinated with robotic devices within the fleet.

Other types of vehicles and mobile robotic devices than those illustrated here may also be included as well or instead. For example, the vehicle fleet 200 may include variations of fork truck 214 such as a pallet jack and/or a fork truck/pallet jack hybrid. In some examples, one or more vehicles and/or robotic devices may use different modes of transportation besides wheels on the ground. For instance, one or more robotic vehicles/devices may be airborne (e.g., quadcopters), and may be used for tasks such as moving objects or collecting sensor data of the environment.

In further examples, the robotic fleet 200 may also include various fixed components that may be positioned within the warehouse. In some examples, one or more fixed robotic devices may be used to move or otherwise process boxes. For instance, a pedestal robot 222 may include a robotic arm elevated on a pedestal that is fixed to the ground floor within the warehouse. The pedestal robot 222 may be controlled to distribute boxes between other robots and vehicles and/or to stack and unstack pallets of boxes. For example, the pedestal robot 222 may pick up and move boxes from nearby pallets 240 and distribute the boxes to individual AGV's 212 for transportation to other locations within the warehouse.

In additional examples, robotic fleet 200 may employ additional fixed components positioned within a warehouse space. For instance, high-density storage racks 224 may be used to store pallets and/or objects within the warehouse. The storage racks 224 may be designed and positioned to facilitate interaction with one or more vehicles and/or robotic devices within the fleet, such as autonomous fork truck 214. In further examples, certain ground space may be selected and used for storage of pallets or boxes as well or instead. For instance, pallets 230 may be positioned within the warehouse environment at chosen locations for certain periods of time to allow the pallets to be picked up, distributed, or otherwise processed by one or more of the vehicles and/or robotic devices.

Figure 2B:
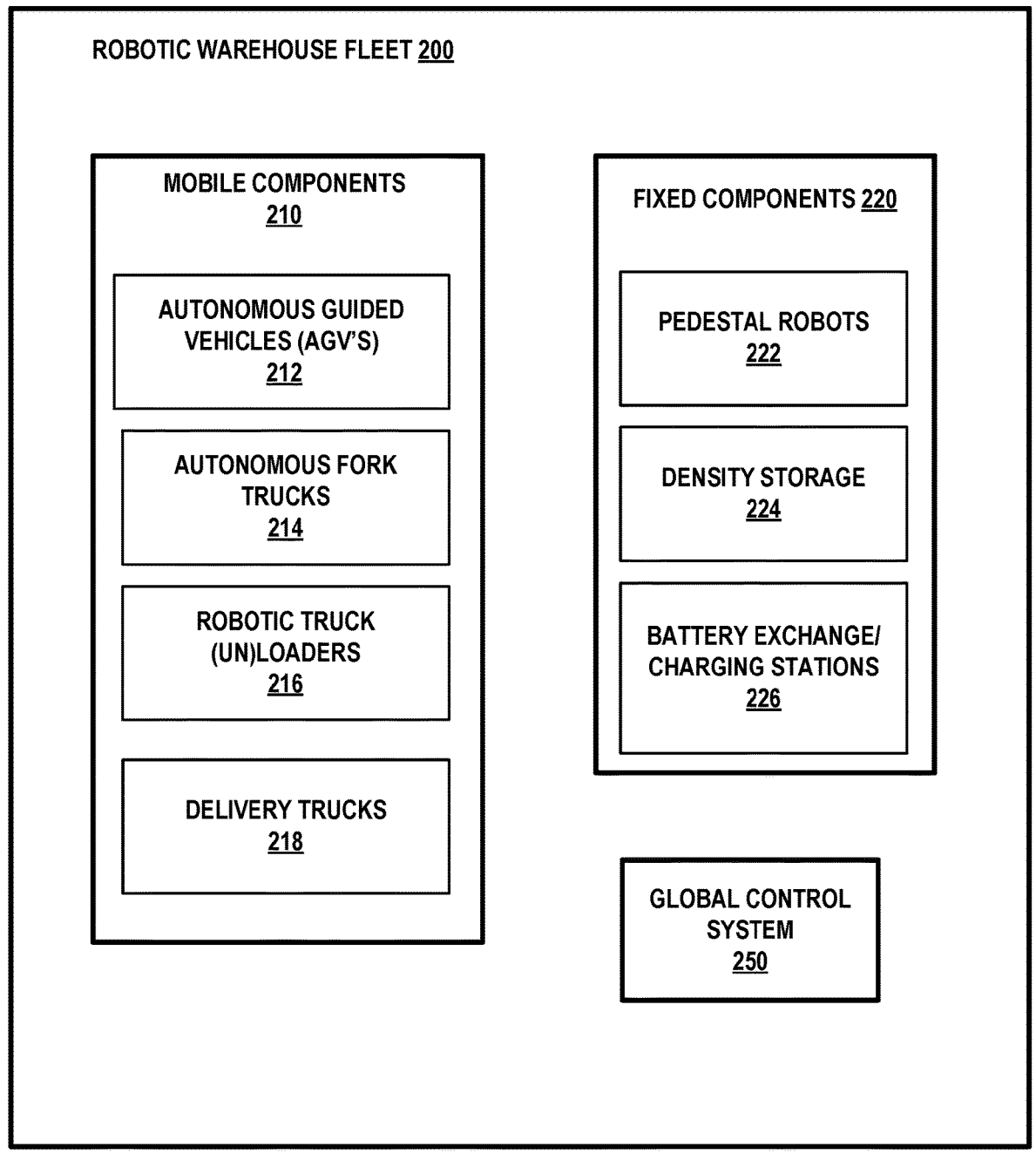
FIG. 2B illustrates a functional block diagram of components of a robotic fleet, according to an example embodiment.

FIG. 2B is a functional block diagram illustrating components of a robotic warehouse fleet 200, according to an example embodiment. The robotic fleet 200 could include one or more of various mobile components, such as AGV's 212, autonomous fork trucks 214, robotic truck loaders/unloaders 216, and delivery trucks 218. The robotic fleet 200 may additionally include one or more fixed components positioned within a warehouse or other environment, such as pedestal robots 222, density storage containers 224, and battery exchange/charging stations 226. In further examples, different numbers and types of the components illustrated within FIG. 2B may be included within a fleet, certain types may be omitted, and additional functional and/or physical components may be added to the examples illustrated by FIGS. 2A and 2B as well. To coordinate actions of separate components, a global control system 250, such as a remote, cloud-based server system, may communicate (e.g., through wireless communication) with some or all of the system components and/or with separate local control systems of individual components.

In some examples, global control system 250 may include a central planning system that assigns tasks to different robotic devices within fleet 200. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 250 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally. In another example, the global planner may provide the vehicles and robotic devices with predetermined paths. The vehicles and robotic device may control a speed along the predetermined paths and may modify the predetermined paths based on local sensor data.

In additional examples, a central planning system may be used in conjunction with local vision on individual vehicles and/or robotic devices to coordinate functions of robots within robotic vehicle fleet 200. For instance, a central planning system may be used to get the vehicles and/or robots relatively close to where they need to go. However, it may be difficult for the central planning system to command vehicles and/or robots with millimeter precision, unless the vehicles/robots are bolted to rails or other measured components are used to precisely control vehicle/robot positions. Local vision and planning for individual vehicles and/or robotic devices may therefore be used to allow for elasticity between different vehicles and/or robotic devices. A general planner may be used to get a vehicle/robot close to a target location, at which point local vision of the vehicle/robot may take over. In some examples, most vehicle/robotic functions may be position-controlled to get the vehicles/robots relatively close to target locations, and then vision and handshakes may be used when needed for local control.

In further examples, visual handshakes may enable two vehicles/robots to identify one another by AR tag or other characteristics, and to perform collaborative operations within fleet 100. In additional examples, items (e.g., packages to be shipped) may be provided with visual tags as well or instead, which may be used by the vehicles and/or robotic devices to perform operations on the items using local vision control. In particular, the tags may be used to facilitate manipulation of the items by the vehicles and/or robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual vehicles/robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic vehicle fleets and/or traditional warehouses. For instance, global control system 250 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 200 and objects undergoing processing by the robotic devices. In some examples, the map may be continuously updated with information about dynamic objects (e.g., moving robots and packages moved by robots). In additional examples, a dynamic map could contain information on both the current configuration and/or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). The map may be used to determine paths for the vehicles and robotic devices to follow in order to traverse the environment of the warehouse.

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by vehicles and robots. A potential benefit may be added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 210 within robotic fleet 200 may periodically receive charged batteries from a battery exchange station 226 equipped with multiple battery chargers. In particular, the station 226 may replace a mobile robot's old batteries with recharged batteries, which may prevent robots from having to sit and wait for batteries to charge. The battery exchange station 226 may be equipped with a robotic manipulator such as a robotic arm. The robotic manipulator may remove batteries from an individual mobile robot and attach the batteries to available battery chargers. The robotic manipulator may then move charged batteries located at the station 226 into the mobile robot to replace the removed batteries. For instance, an AGV 212 with a weak battery may be controlled to move over to battery exchange station 226 where a robotic arm pulls a battery out from the AGV 212, puts the battery in a charger, and gives the AGV 212 a fresh battery.

Figure 3A:
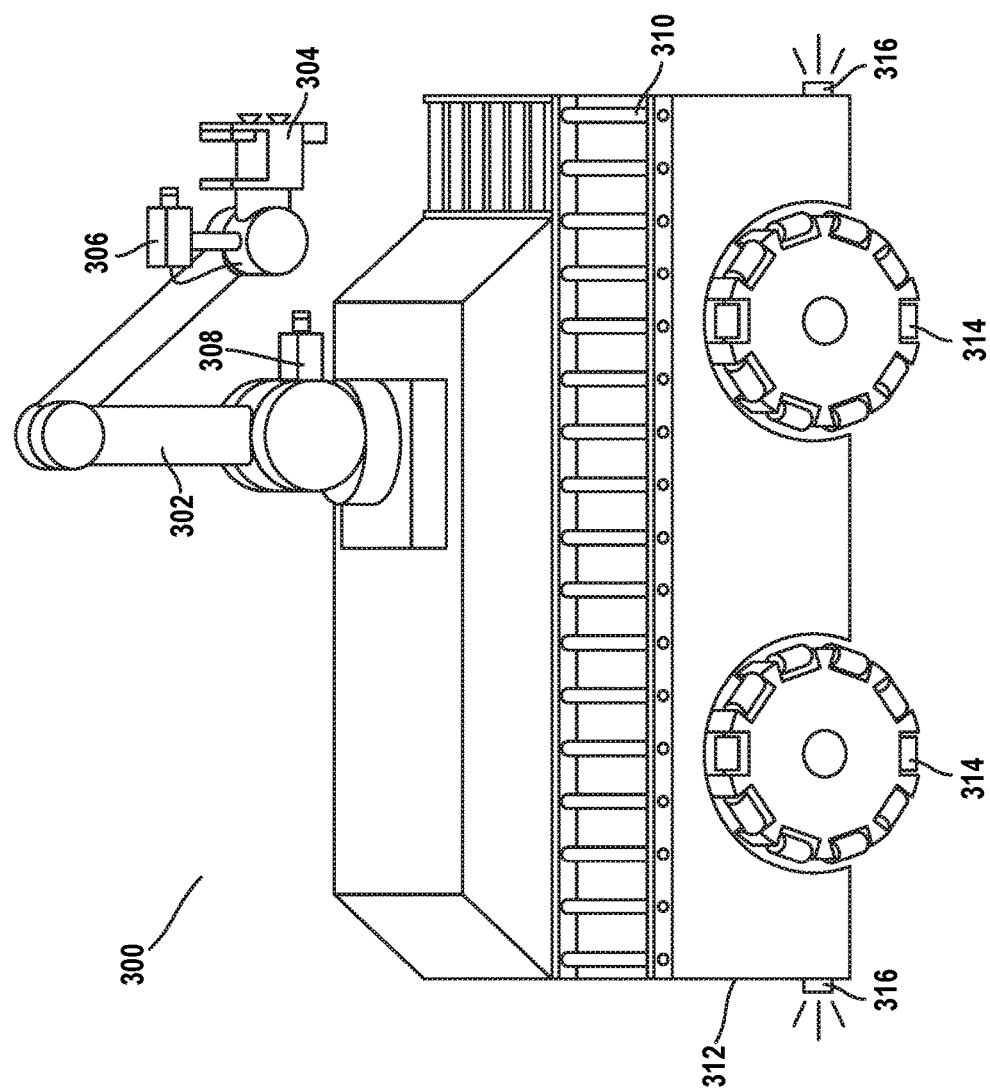
FIG. 3A illustrates a robotic truck unloader, according to an example embodiment.
Figure 3B:
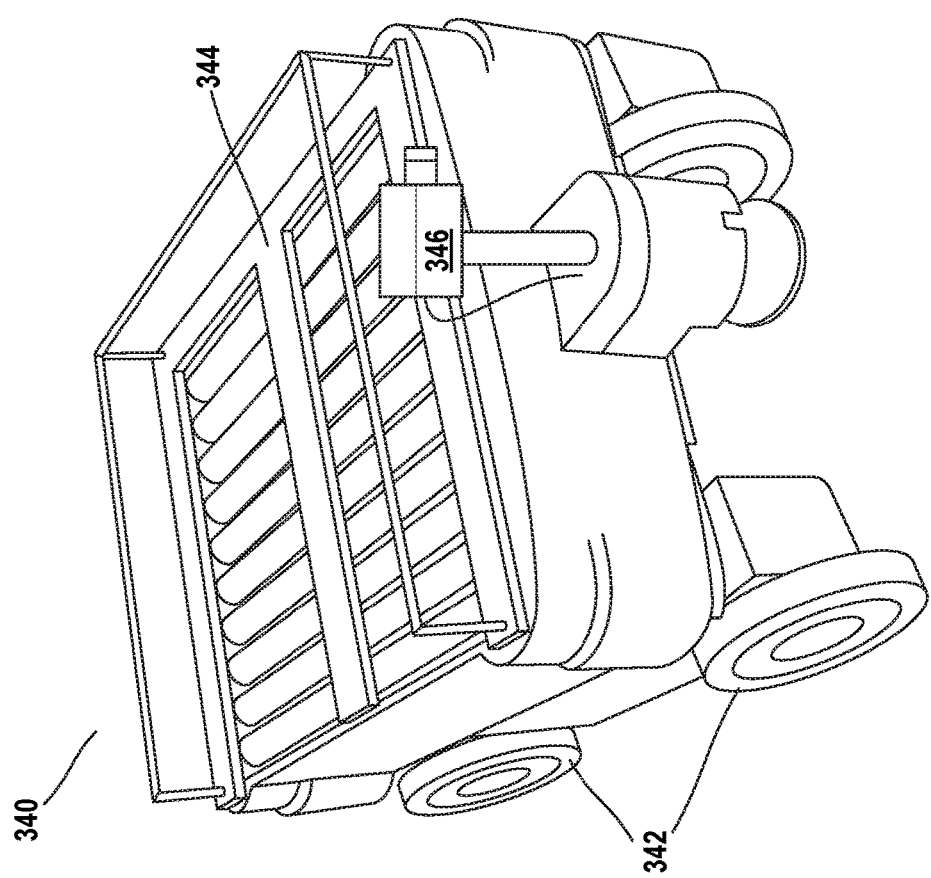
FIG. 3B illustrates an autonomous guided vehicle, according to an example embodiment.
Figure 3C:
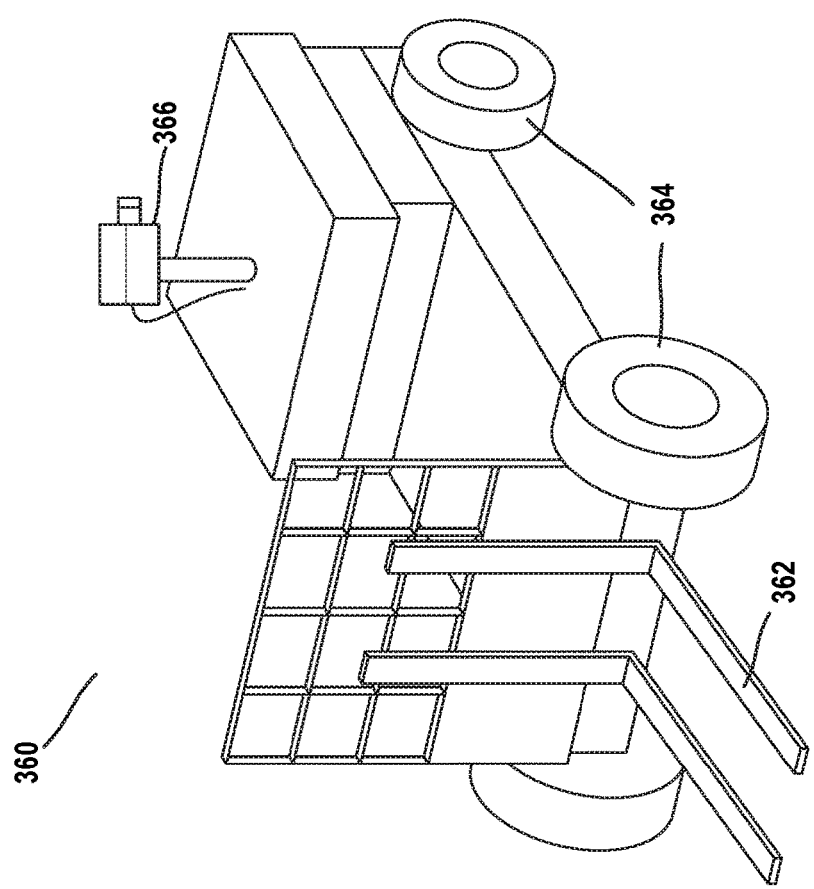
FIG. 3C illustrates an autonomous fork truck, according to an example embodiment.

FIGS. 3A, 3B, and 3C illustrate several examples of vehicles that may be included within a robotic vehicle warehouse fleet. Other robotic devices that vary in form from those illustrated here as well as other types of robotic devices may also be included.

FIG. 3A illustrates a robotic truck unloader 300, according to an example embodiment. Robotic truck unloader 300 may be an example of vehicle system 100, as illustrated in FIG. 1. In some examples, a robotic truck unloader may include one or more sensors, one or more computers, and one or more robotic arms. The sensors may move along a sensor trajectory to scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 300 may include a robotic arm 302 with a gripping component 304 for gripping objects within the environment. The robotic arm 302 may use the gripping component 304 to pick up and place boxes to load or unload trucks or other containers. The truck unloader 300 may also include a moveable cart 312 with wheels 314 for locomotion. The wheels 314 may be holonomic wheels that allow the cart 312 to move with two degrees of freedom. Additionally, a wrap around front conveyor belt 310 may be included on the holonomic cart 312. In some examples, the wrap around front conveyor belt may allow the truck loader 300 to unload or load boxes from or to a truck container or pallet without having to rotate gripper 304.

In further examples, a sensing system of robotic truck unloader 300 may use one or more sensors attached to a robotic arm 302, such as sensor 306 and sensor 308, which may be two-dimensional (2D) sensors and/or 3D depth sensors that sense information about the environment as the robotic arm 302 moves. In some examples, sensors 306 and/or 308 may be vision sensors (e.g., stereo cameras) having a limited field of view. Robotic arm 302 may be controlled to move sensor 306 to control a portion of the environment observable by the sensor 306.

The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 316 and a rear navigation sensor 318, and one or more sensors mounted on a robotic arm, such as sensor 306 and sensor 308, may be integrated to build up a digital model of the environment, including the sides, floor, ceiling, and/or front wall of a truck or other container. Using this information, the control system may cause the mobile base to navigate into a position for unloading or loading.

In further examples, the robotic arm 302 may be equipped with a gripper 304, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 300 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

FIG. 3B shows an autonomous guided vehicle (AGV), according to an example embodiment. More specifically, AGV 340 may be a relatively small, mobile robotic device that is capable of transporting individual boxes or cases. The AGV 340 may include wheels 342 to allow for locomotion within a warehouse environment. Additionally, a top surface 344 of the AGV 340 may be used to places boxes or other objects for transport. In some examples, the top surface 344 may include rotating conveyors to move objects to or from the AGV 340. The AGV 340 may include sensor 346 (e.g., stereo camera) connected to AGV 340 and configured to move with respect to the AGV 340 to observe different portions of the environment (e.g., rotate and/or translate with respect to the AGV 340). Sensor 346 may be used in obstacle detection, vehicle localization, and pallet/object detection, among other tasks. In some example implementations, sensor 364 may be connected to a different portion of AGV 340 than shown in FIG. 3B.

In additional examples, the AGV 340 may be powered by one or more batteries that can be quickly recharged at a battery charging station and/or exchanged for fresh batteries at a battery exchange station. In further examples, the AGV 340 may additionally include other components not specifically identified here, such as sensors for navigation. AGVs with different shapes and sizes also may be included within a robotic warehouse fleet, possibly depending on the types of packages handled by a warehouse.

FIG. 3C shows an autonomous fork truck, according to an example embodiment. More specifically, autonomous fork truck 360 may include a forklift 362 for lifting and/or moving pallets of boxes or other larger materials. In some examples, the forklift 362 may be elevated to reach different racks of a storage rack or other fixed storage structure within a warehouse. The autonomous fork truck 360 may additionally include wheels 364 for locomotion to transport pallets within the warehouse. In additional examples, the autonomous fork truck may include a motor and power supply as well as a sensing system, such as those described with respect to robotic truck unloader 300. For example, autonomous fork truck 360 may include sensor 366 (e.g., stereo camera) configured to move (e.g., rotate and/or translate) with respect to the autonomous fork truck 360 to observe different portions of the environment. The sensor 366 may be connected to a different portion of autonomous fork truck 360 than shown in FIG. 3C. The autonomous fork truck 360 may also vary in size or shape from the one illustrated in FIG. 3C.

IV. EXAMPLE SENSOR TRAJECTORY DETERMINATION OPERATIONS

The autonomous vehicles described and illustrated herein (e.g., robotic truck unloader 300, AGV 340, and fork truck 360) as well as other similar vehicles and robotic devices (e.g., autonomous pallet jack) may be used to perform a plurality of tasks in a warehouse or similar setting. For examples, the vehicles may be used for receiving object, storing objects, retrieving objects from storage, transporting objects, delivering objects from the warehouse, or otherwise processing objects in a warehouse of similar setting. The vehicles may move to particular areas of a warehouse or storage facility to pick up boxes for transport to another location. The vehicles may construct or deconstruct pallets of boxes and/or open boxes to manipulate items within the boxes.

In performing the plurality of tasks, the autonomous vehicles may be directed by, for example, global control system 250 illustrated in FIG. 2A, to travel along predetermined paths. Global control system 250 may generate the predetermined paths in order to synchronize the operations of the autonomous vehicles and minimize the probability of collisions with other vehicles, objects, features of the environment, and/or human workers within the environment. The predetermined paths may synchronize the vehicles to load/unload trucks, construct/deconstructs pallets, and perform any of the other operations described or otherwise contemplated herein.

Some or all of the autonomous vehicles may be equipped with a sensor having a limited field of view. Within examples, a field of view may be an angular expanse (e.g., volume or area) visible to the sensor at a given time. A sensor without a limited field of view may be able to observe a full 360 degrees of angular expanse around the sensor without needing to rotate the sensor. In contrast, a sensor with a limited field of view might be able to only observe a portion of the full 360-degree angular expanse around the sensor. Accordingly, the sensor may need to be rotated or moved to observe the full 360 degrees of angular expanse around the sensor. In one example, the limited field of view may comprise a 45-degree angular expanse visible to the sensor at a given time. Thus, only one eighth of the full 360-degree angular expanse around the sensor may be observable by the sensor at a given time (e.g., be within the field of view of the sensor).

The sensor may be a vision sensor (e.g., sensor 306, 308, 346, or 366, as shown in FIGS. 3A, 3B, and 3C). In some examples, the sensor may be a primary sensor and/or an only sensor used to gather data for navigation around the environment and recognition of objects within the environment by the autonomous vehicle. Consequently, the sensor may be used to collect sensor data for a plurality of objectives including, for example, obstacle detection, vehicle localization, and object detection (e.g., pallet detection, box detection). Using a single sensor to collect sensor data for the plurality of objectives may be less expensive than using one sensor per objective of the plurality of objectives. Furthermore, using one sensor as opposed to multiple sensors may decrease computational complexity associated with processing data from multiple sensors as well as decrease an amount of hardware needed to receive and process the data from multiple sensors.

Figure 4:
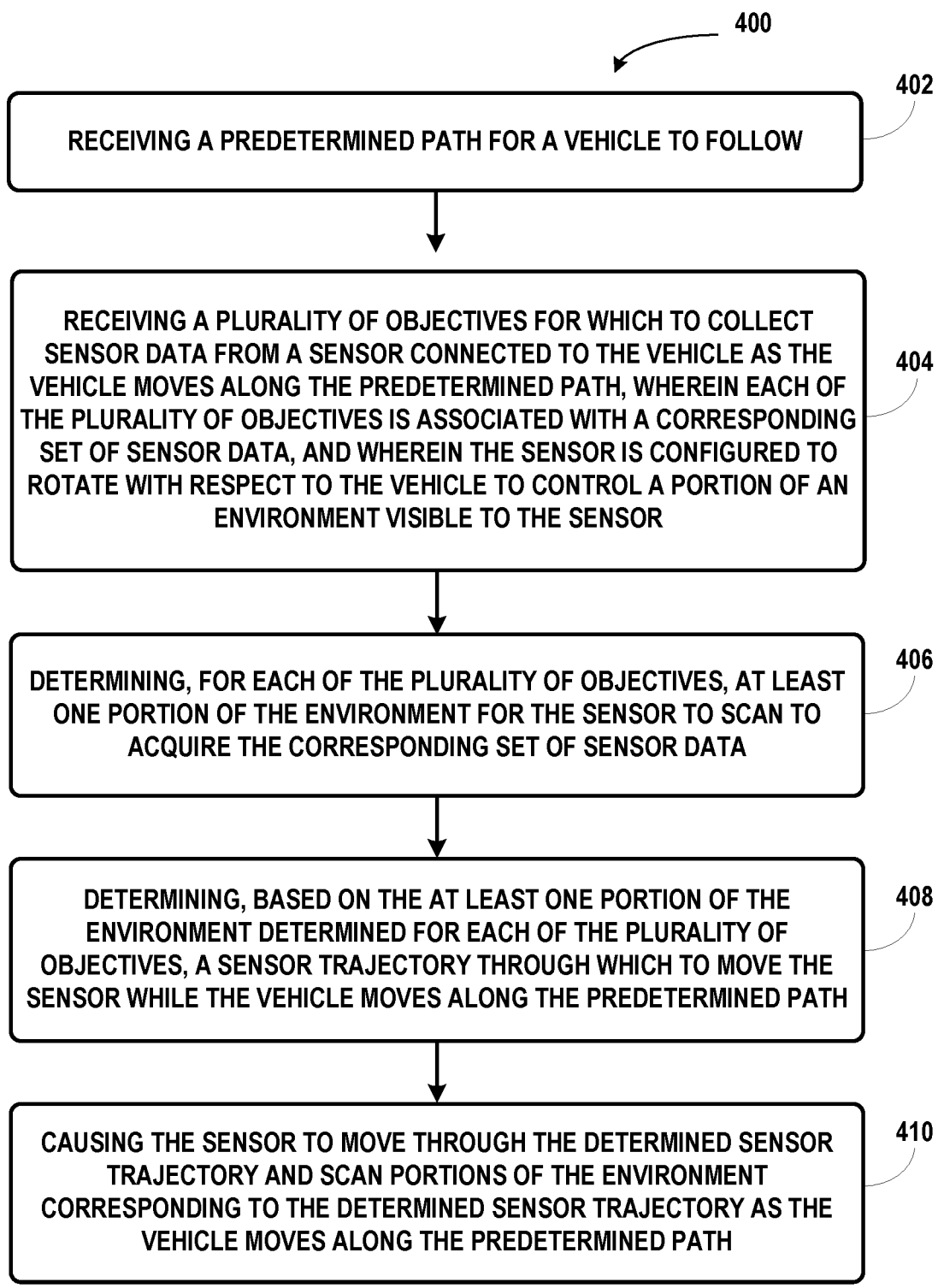
FIG. 4 illustrates example sensor trajectory planning operations, according to an example embodiment.

FIG. 4 illustrates an example flow diagram 400 of operations for determining a sensor trajectory for a sensor. In block 402, a predetermined path may be determined and/or received for a vehicle to follow. Within examples, the predetermined path may be a path through at least a portion of an environment in which the vehicle is operating or is expected to operate. The predetermined path may be determined by a global control system configured to synchronize operations of multiple vehicles. Alternatively, the predetermined path may be determined by a control system local to the vehicle (e.g., a navigation system of the vehicle).

In block 404, a plurality of objectives for which to collect sensor data from a sensor connected to the vehicle as the vehicle moves along the predetermined path may be determined and/or received. Within examples, an objective may be a task or function that a vehicle within the fleet of vehicles is planned or configured to perform, where performance of the task or function is dependent on acquisition of a corresponding/associated set of sensor data. Accordingly, each of the plurality of objectives may be associated with a corresponding set of sensor data. A corresponding set of sensor data associated with a particular objective of the plurality of objectives may be a set of data needed to accomplish the particular objective. For example, when the particular objective is obstacle detection along the predetermined path, the corresponding set of sensor data may include sensor data representing portions of the environment along the predetermined path. The sensor data representing portions of the environment along the predetermined path may be needed and/or sufficient to detect obstacles along the predetermined path.

The sensor may be configured to rotate and/or translate with respect to the vehicle to control a portion of an environment visible to the sensor. The rotation of the sensor may be about at least one of a pitch axis, a roll axis, and a yaw axis. The translation of the sensor may be along at least one of an x-axis, a y-axis, and a z-axis. The sensor may be configured to translate with respect to the vehicle using one or more translational motion mechanisms. In one example, the sensor may be connected to a lead screw configured to move the sensor horizontally or vertically with respect to the vehicle. In another example, the sensor may be connected to the vehicle through a telescopic arm configured to raise and lower the sensor with respect to the vehicle.

In block 406, for each of the plurality of objectives, at least one portion of the environment for the sensor to scan to acquire the corresponding set of sensor data may be determined. In the obstacle detection example above, the at least one portion of the environment may include portions of the environment along the predetermined path (e.g., areas of the environment expected to be occupied by the vehicle as the vehicle moves along the predetermined path). In another example, when the objective is detection of objects of interest, the at least one portion of the environment may include areas on either side of the vehicle expected to be occupied by the objects of interest. Specifically, the vehicle may be moving through an aisle of a warehouse and may scan shelves/racks on either side of the vehicle in order to identify objects of interest. The objects may be identified based on, for example, fiducial markers/tags (e.g., ARTags, AprilTags) attached to or disposed on the objects.

In block 408, a sensor trajectory through which to move the sensor while the vehicle moves along the predetermined path may be determined based on the at least one portion of the environment determined for each of the plurality of objectives. The sensor trajectory may include an angular position trajectory through which to move the sensor as the vehicle moves along the predetermined path and a velocity profile corresponding to the angular position trajectory indicating a velocity with which to move the sensor along the angular position trajectory.

In block 410, the sensor may be caused to move through the determined sensor trajectory and scan portions of the environment corresponding to the determined sensor trajectory as the vehicle moves along the predetermined path. In some examples, scanning portions of the environment corresponding to the determined sensor trajectory may include scanning each of the at least one portion of the environment determined for each of the plurality of objectives. In other examples, scanning portions of the environment corresponding to the determined sensor trajectory may include scanning a subset of the at least one portions of the environment determined for each of the plurality of objectives.

V. EXAMPLE DETERMINATIONS OF PORTIONS OF THE ENVIRONMENT FOR INDIVIDUAL OPERATIONS

Determining the at least one portion of the environment for the sensor to scan to acquire the set of sensor data corresponding to an objective of the plurality of objectives may include determining an expected position of an object within the environment. In one example, the expected position of the object may be determined based on previous scans of portions of the environment with the sensor. The previous scans may be conducted by the vehicle and/or a number of other vehicles forming a part of the vehicle fleet. The portion of the environment expected to contain the object may be scanned to determine whether the object is still in the expected position or whether the object has been moved. Similarly, uncertainty in the exact position of the vehicle within the environment may cause the sensor to scan the portion of the environment expected to contain the object in order to more accurately determine the relative position between the vehicle and the object.

In another example, the control system of the vehicle may assume that particular portions of the environment contain objects of interest. For example, when moving through an aisle of a warehouse, the control system may expect that objects of interests (e.g., boxes, pallets) are disposed on shelves forming the aisles of the warehouse. Similarly, when performing obstacle detection along the predetermined path, the control system may cause the sensor to scan portions of the environment corresponding to the predetermined path in order to determine whether any obstacles are present along the predetermined path.

Figure 5:
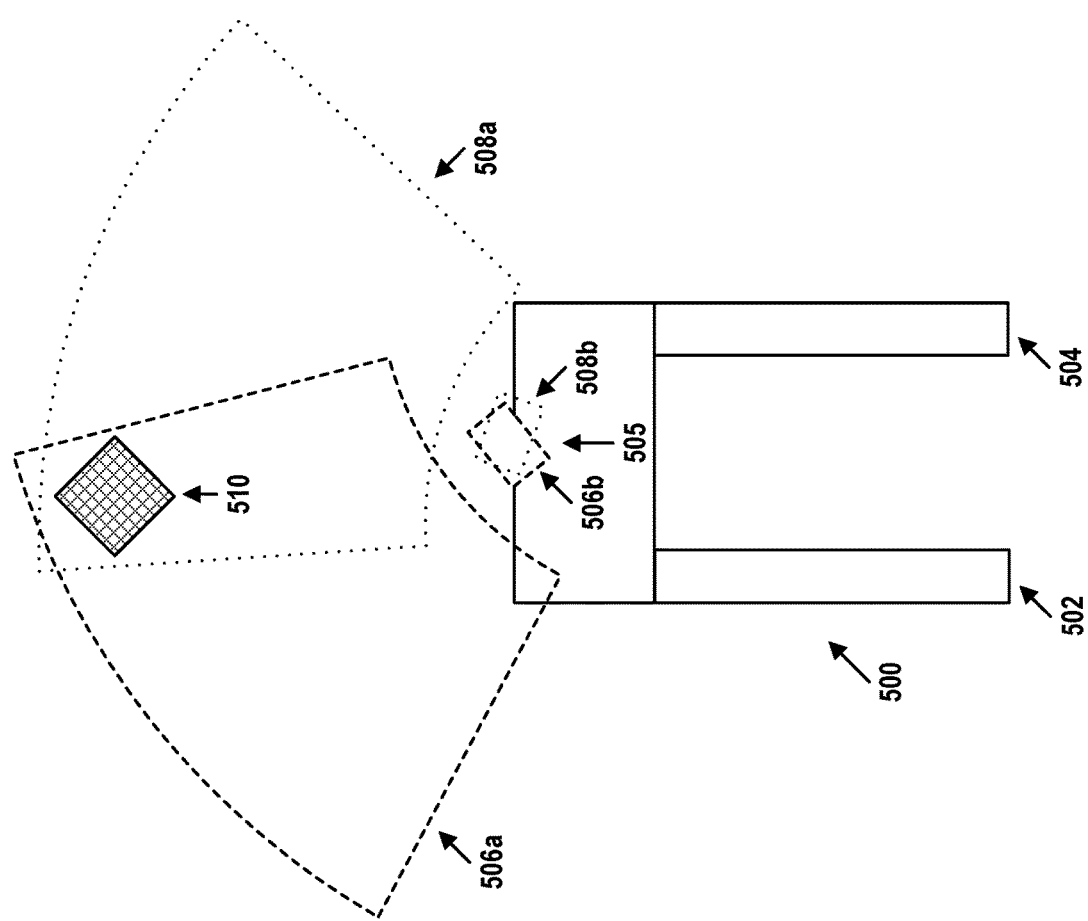
FIG. 5 illustrates an example feature detection operation, according to an example embodiment.

FIG. 5 illustrates example operations for determining at least one portion of the environment for the sensor to scan in order to acquire a set of sensor data corresponding to a particular objective of the plurality of objectives. Specifically, FIG. 5 illustrates a top-down view of the vehicle as pallet jack 500. Although the vehicle in FIG. 5 is illustrated as a pallet jack, the vehicle may be any of the other vehicles described or otherwise contemplated herein.

Pallet jack 500 includes forks 502 and 504 that may be used to pick up and move pallets. Pallet jack 500 additionally includes sensor 505. The sensor 505 is shown in orientation 506*b* (shown with a dashed line) with a corresponding field of view 506*a* (shown with a dashed line) and in orientation 508*b* (shown with a dotted line) producing a corresponding field of view 508*a* (shown with a dotted line). The fields of view 506*a* and 508*a* may be two-dimensional (2D) projections of a three-dimensional (3D) field of view of the sensor 505 onto a floor plane of the environment in which the pallet jack 500 is operating. The fields of view 506*a* and 508*a* may be of identical size and shape and may differ only in the position of the sensor (506*b* and 508*b*) producing the corresponding field of view.

An object of interest 510 is shown within the fields of view 506*a* and 508*a* of sensor 505. An angle of sensor 505 with respect to pallet jack 500 in position 506*b* may comprise a minimum sensor angle that results in the extent of the field of view of the sensor 505 intersecting the position of object 510. Similarly, an angle of sensor 505 with respect to pallet jack 500 in position 508*b* may comprise a maximum sensor angle that results in the extent of the field of view of the sensor 505 intersecting the position of object 510. Object of interest 510 may be, for example, a pallet, box, feature of the environment, another object of interest, or a fiducial tag located thereon (e.g., AprilTag). A buffer distance may be added to an expected or actual size of the object 510 to ensure that the entirety of object 510 completely intersects with or is contained within the fields of view 506*a* and 508*a*.

Accordingly, determining the sensor trajectory through which to move the sensor may include determining a range of angular positions of the sensor such that the extent of the field of view of the sensor intersects the expected position of the object when an angular position of the sensor is within the determined range of angular positions. The angular position of sensor 505 corresponding to orientation 506*b* may form a first limit of the determined range (e.g., a minimum of the determined range). Likewise, the angular position of sensor 505 corresponding to orientation 508*b* may form a second limit of the determined range (e.g., a maximum of the determined range). The determined range of angular positions may be expressed in a reference frame of the vehicle or a reference frame of the environment.

In some embodiments, the level of zoom/magnification of sensor 505 may be adjustable and/or controllable by a control system of pallet jack 500. Adjusting the level of zoom may result in the fields of view 506a and 508b becoming larger or smaller. Specifically, a higher level of zoom/magnification may cause the fields of view 506a and 508a to become longer and more narrow (e.g., the curved sections of field of view 506a may move farther apart and the straight sections may move closer together). A lower level of zoom/magnification may cause the fields of view 506a and 508a to become wider and shorter (e.g., the curved sections of field of view 506a may move closer together and the straight sections may move farther apart).

Accordingly, determining the sensor trajectory through which to move the sensor may include determining a plurality of ranges of angular positions of the sensor for each of a plurality of possible levels of sensor zoom/magnification. Each plurality of ranges may be such that the extent of the field of view of the sensor at a given zoom level intersects the expected position of the object when an angular position of the sensor is within the determined range of angular positions.

Figure 6:
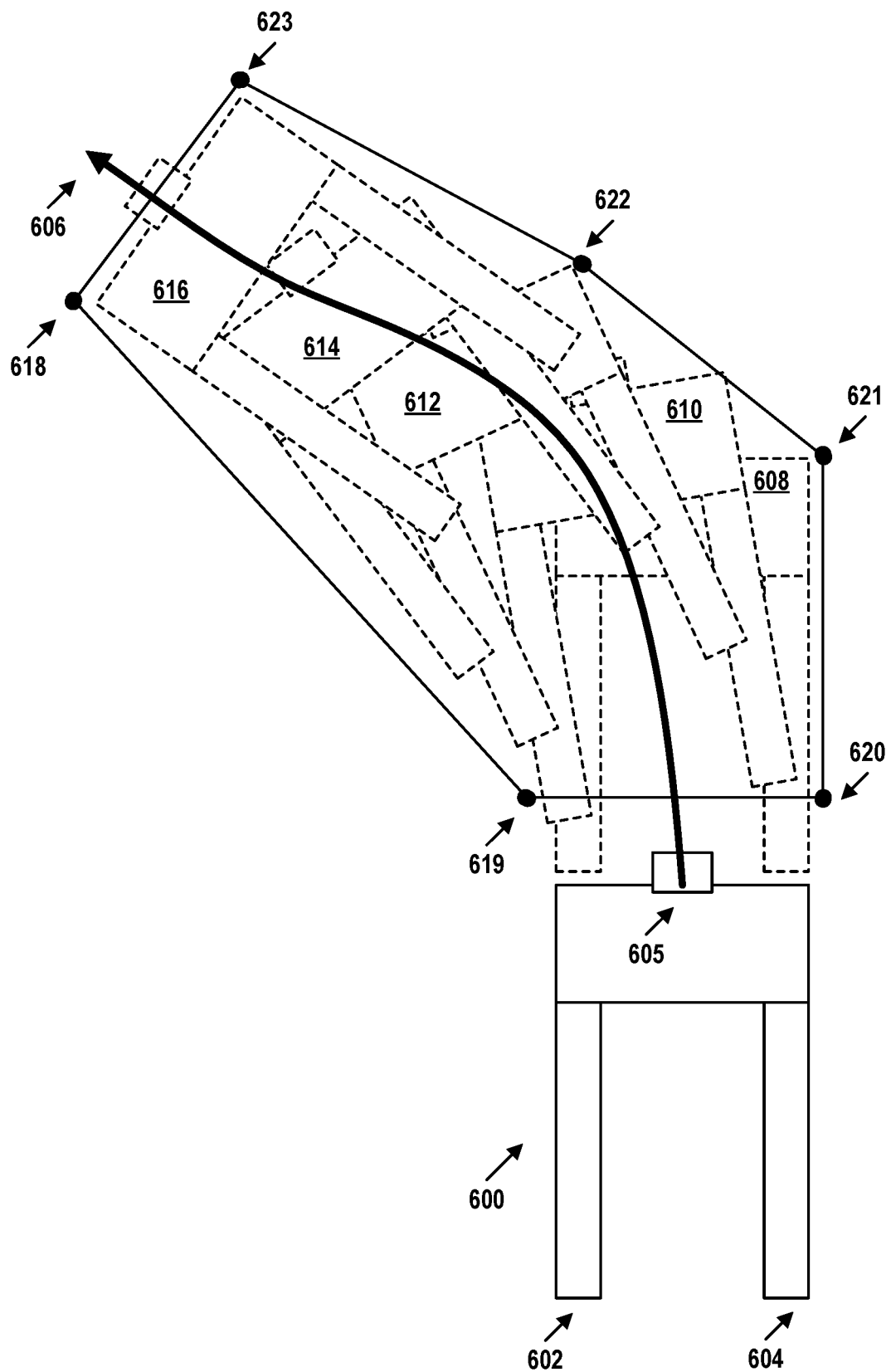
FIG. 6 illustrates example obstacle detection operations, according to an example embodiment.

FIG. 6 illustrates alternative example operations for determining at least one portion of the environment for the sensor to scan in order to acquire a set of sensor data corresponding to a particular objective of the plurality of objectives. Specifically, FIG. 6 illustrates an extent of the environment for which to collect sensor data in order to detect obstacles along the predetermined path for the vehicle. The vehicle is shown in the form of pallet jack 600 having forks 602 and 604 and sensor 605 may receive a predetermined trajectory 606 to follow through a portion of the environment. A control system may determine a plurality of projected geometric representations of pallet jack 600 at expected locations of pallet jack 600 along predetermined path 606. Specifically, the control system may determine geometric representations 608, 610, 612, 614, and 616 of pallet jack 600 along predetermined trajectory 606.

In order to prevent collisions of pallet jack 600 with objects in the environment, sensor 605 may be used to scan portions of the environment expected to be occupied by pallet jack 600 at future times as the pallet jack moves along predetermined path 606 (e.g., areas of the environment occupied by projected geometric representations 608, 610, 612, 614, and 616 of pallet jack 600). A convex polygon having vertices 618-623 may be fitted to the projected geometric representations 608-616 of pallet jack 600 in order to outline the portions of the environment for which to collect sensor data in order to detect obstacles along the predetermined path 606. The vertices 618-623 of the convex polygon may be critical points for the sensor to scan in order to sweep the field of view of the sensor 605 over the convex polygon, thus scanning all the portions of the environment for which to collect sensor data in order to detect obstacles along the predetermined path 606.

The procedure described with respect to FIG. 5 may be followed for each of the critical points (e.g., vertices 618-623) to determine, for each critical point, a range of angular positions of the sensor (as well as minimum and maximum boundaries of the range) that places the critical point within the field of view of the sensor. Based on the maximum and minimum angles determined for each of the vertices 618-623, a global maximum angle and a global minimum angle may be determined for the convex polygon (e.g., a global range of angular positions of the sensor that the sensor may move through in order to sweep out the area of the convex polygon with the field of view of the sensor). The global maximum angle and the global minimum angle may be represented in a reference frame of the vehicle or a reference frame of the environment.

Sweeping the sensor 605 from the global minimum angle to the global maximum angle may cause the sensor to scan the area of the convex polygon, thus scanning the portions of the environment expected to be occupied by pallet jack 600 (e.g., portions occupied by projections 608, 610, 612, 614, and 616) while moving along predetermined trajectory 606. Sweeping the sensor 605 through a portion of the range of angles between the global minimum angle and the global maximum angle may cause the sensor 605 to scan a subset of the portions of the portions of the environment expected to be occupied by pallet jack 600. For example, scanning the area of the convex polygon between vertices 619-622 may completely scan portions of the environment expected to be occupied by projection 608 and partially scan portions of the environment expected to be occupied by projections 610, 612, and 614.

In some embodiments, the convex polygon having vertices 618-623 might not encompass the area directly in front of pallet jack 600, as shown in FIG. 6. The area directly in front of pallet jack 600 may be omitted due to the field of view of the sensor not extending to the close proximity of the pallet jack 600. Sensor 605 may be unable to scan portions of the environment within a particular distance of the sensor 605, as illustrated by the gap between sensor 505 in orientation 506b and the projected field of view 506a in FIG. 5. Further, the area in front of the pallet jack 600 may be omitted from the convex polygon due to the area having previously been scanned by sensor 605.

VI. EXAMPLE CANDIDATE SENSOR TRAJECTORY PLANNING OPERATIONS

Figure 7:
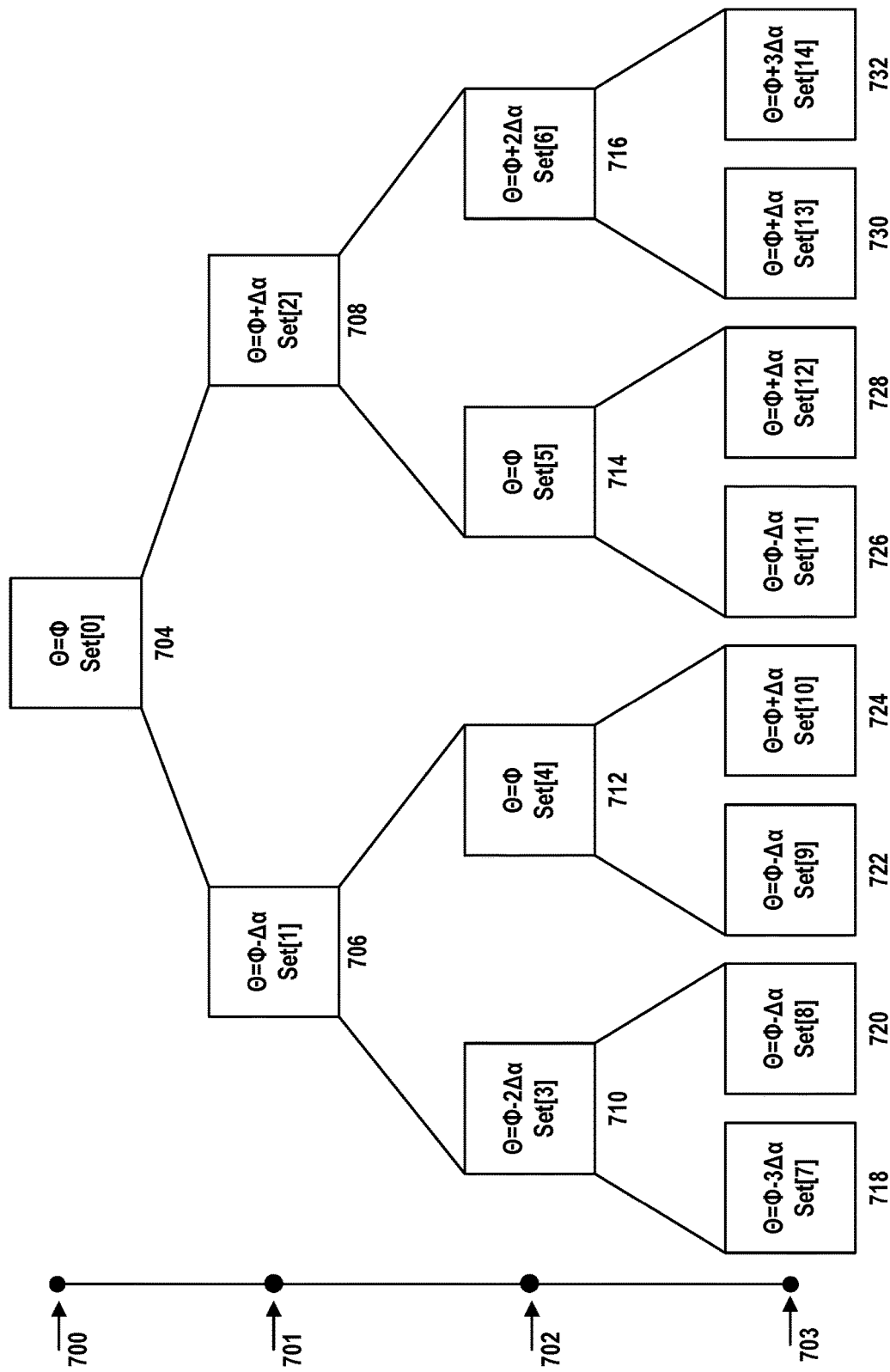
FIG. 7 illustrates example candidate trajectory planning operations, according to an example embodiment.

FIG. 7 illustrates a graphical representation of a process for determining a plurality of candidate sensor trajectories. Specifically, a timeline corresponding to the predetermined trajectory may be discretized into a plurality of time points 700-703. Time point 700 may correspond to a start of the predetermined trajectory and time point 703 may correspond to an end of the predetermined trajectory. In general, there may be more or fewer time points depending on a length of the predetermined path and a granularity with which the predetermined path is discretized. The granularity with which the predetermined path is discretized may be based on frame rate limitations of the sensor and/or hardware limitations of a control system or computing device performing the operations herein described.

For each of the time points 700-703, ranges of angular position of the sensor may be determined that place the objects of interests (e.g., boxes or pallets) or the determined portions of the environment corresponding to each of the plurality of objectives (e.g., the area expected to be occupied by the vehicle along the predetermined trajectory) within the field of view of the sensor, as described with respect to FIG. 5 and FIG. 6.

At time point 700, corresponding to the start of the predetermined path, the sensor may be at an angular position $\Theta=\Phi$, where $\Phi$ is an initial angular position of the sensor at the start of the predetermined path, as shown in block/node 704. Block 704 as well as blocks 706-732 may be a visual representation of nodes of a data structure stored in a memory of a computing device. A set of features, objects, and/or portions of the environment visible to the sensor from a vehicle position and angular sensor position corresponding to node 704 may be stored as part of node 704, as indicated by Set[0] in node 704. Set[0] may be determined based on the determined ranges of angular position of the sensor that place the object of interest and/or the determined portions of the environment corresponding to each of the plurality of objectives within the field of view of the sensor.

Specifically, a control system may determine whether the angular sensor position $\Theta=\Phi$ of the sensor in block 704 is contained within or intersects the determined ranges of angular positions. When the angular sensor position $\Theta=\Phi$ of the sensor is contained within or intersects the determined ranges of angular positions, the control system may determine that the objects of interest and/or the determined portions of the environment corresponding to each of the plurality of objectives may be observable by the sensor from the expected vehicle position at time point 700 and the angular position of the sensor $\Theta=\Phi$ at time point 700. In particular, the control system may determine which of the objects of interest and/or the determined portions of the environment will be observable to the sensor and may store this information in Set[0].

The sensor may be limited to move with respect to the vehicle with a particular maximum velocity. Thus, in the time difference between time point 700 and time point 701, the sensor may pan to the left or to the right by a distance equal to the product of the maximum velocity and the time difference between time point 700 and time point 701. The maximum pan distance between consecutive time points is represented in FIG. 7 as $\Delta\alpha$. Although FIG. 7 considers only the case where the sensor rotates left or right in two dimensions, the same process may be extended to sensor motion in three dimensions. Further, in addition to moving the sensor to the left or to the right, the angular position of the sensor may remain unchanged. This case is not illustrated by FIG. 7 for simplicity of illustration but is nevertheless herein contemplated.

Accordingly, at time point 701, the sensor may take on candidate angular position $\Theta=\Phi-\Delta\alpha$ (leftward rotation from initial position $\Theta=\Phi$ by $\Delta\alpha$), as shown in node 706, $\Theta=\Phi$ (position unchanged, not shown), and $\Theta=\Phi+\Delta\alpha$ (rightward rotation from initial position $\Theta=\Phi$ by $\Delta\alpha$), as shown in node 708. Again, at each of the nodes 706 and 708, a set of features, objects, and/or portions of the environment visible to the sensor from a vehicle position and angular sensor position corresponding to nodes 706 and 708 may be stored as part of nodes 706 and 708, as indicated by Set[1] in node 706 and Set[2] in node 708. Nodes 706 and 708 may additionally contain a cumulative set of data representing a cumulative list of objects and/or features/portions of the environment observable to the sensor along the series of nodes traversed starting from node 704 in order to reach each of nodes 706 and 708. Thus, nodes 706 and 708 may additionally contain a list of features observable in node 704 (e.g., Set[0]). The cumulative set of data may be stored as part of Set[1] and Set[2].

At time point 702, the process of determining candidate angular positions may be further repeated starting at each of nodes 706 and 708. Specifically, moving from angular position $\Theta=\Phi-\Delta\alpha$ represented by node 706, the sensor may take on candidate angular position $\Theta=\Phi-2\Delta\alpha$ (leftward rotation from angular position of node 706 $\Theta=\Phi-\Delta\alpha$ by $\Delta\alpha$), as shown in node 710, $\Theta=\Phi-\Delta\alpha$ (position unchanged, not shown), and $\Theta=\Phi$ (rightward rotation from angular position of node 706 $\Theta=\Phi-\Delta\alpha$ by $\Delta\alpha$), as shown in node 712. Likewise, moving from angular position $\Theta=\Phi+\Delta\alpha$ represented by node 708, the sensor may take on candidate angular position $\Theta=\Phi$ (leftward rotation from angular position of node 708 $\Theta=\Phi+\Delta\alpha$ by $\Delta\alpha$), as shown in node 714, $\Theta=\Phi+\Delta\alpha$ (position unchanged, not shown), and $\Theta=\Phi+2\Delta\alpha$ (rightward rotation from angular position of node 708 $\Theta=\Phi+\Delta\alpha$ by $\Delta\alpha$), as shown in node 716. For each of the nodes 710-716, a set of features, objects, and/or portions of the environment visible to the sensor from a vehicle position and angular sensor position corresponding to nodes 710-716 may be stored as part of nodes 710-716, as indicated by Set[3] in node 710, Set[4] in node 712, Set[5] in node 714, and Set[6] in node 716. Each of nodes 710-716 may contain a cumulative set of data representing a cumulative list of objects and/or features/portions of the environment observable by the sensor along the series of nodes traversed in order to reach each of nodes 710-716. The cumulative set of data may be stored as part of Set[3], Set[4], Set[5], and Set[6].

The described process may further be repeated to generate nodes 718-732 at time point 703 with corresponding sets of features, objects, and/or portions of the environment visible to the sensor from a vehicle position and angular position corresponding to nodes 718-732. Each of nodes 718-732 may contain a cumulative set of data representing a cumulative list of objects and/or features/portions of the environment observable by the sensor along the series of nodes traversed starting at node 704 in order to reach each of nodes 718-732. The cumulative set of data may be stored as part of Set[7], Set[8], Set[9], Set[10], Set[11], Set[12], Set[13], Set[14]. For example, Set[7] may include a cumulative list of the data stored in Set[0], Set[1], and Set[3]. Set[12] may include a cumulative list of the data stored in Set[0], Set[2], and Set[5].

The vehicle position and angular sensor position corresponding to nodes 704-732 may be determined based on the projected geometric representations of the vehicle at expected locations of the vehicle along the predetermined path, as described with respect to FIG. 6. As the vehicle moves along the predetermined path, the pose (e.g., position and orientation) of the sensor relative to the environment may change due to the motion of the vehicle even if the sensor itself is not rotated, translated, or otherwise actuated with respect to the vehicle. In other words, as the vehicle moves along the predetermined path, the reference frame of the vehicle may diverge from a static reference frame within the environment. The pose of the sensor with respect to the vehicle might not change unless the sensor is actively actuated or translated. The angular positions of the sensor (e.g., $\Theta=\Phi$ in node 704, $\Theta=\Phi+\Delta\alpha$ in node 708), as shown in FIG. 7, may be expressed in a reference frame of the vehicle. Accordingly, if the determined ranges of angular positions corresponding to objects of interest and/or portions/features of the environment corresponding to the plurality of objectives are expressed in a reference frame different from the reference frame of the vehicle, the determined ranges of angular positions may need to be transformed into a reference frame of the vehicle.

In some embodiments, the pose of the sensor with respect to the environment in the absence of rotation, translation, or actuation of the sensor may be used as an alternative reference frame for determining the sensor trajectory and/or determining how to actuate the sensor to move along the determined sensor trajectory. This reference frame may be referred to as the sensor reference frame. The sensor reference frame may be a dynamic reference frame in that the sensor reference frame may change as the sensor is reoriented and repositioned within the environment due to motion of the vehicle along the predetermined path (but not due to motion of the sensor itself). The sensor reference frame may be determined for a particular time point of a plurality of future time points based on the projected geometric representation of the vehicle at the particular time point and a sensor posse with respect to the vehicle at a time point prior to the particular time point. Accordingly, determining the sensor trajectory may involve determining, for each time point along the predetermined path, how to move the sensor with respect to the sensor reference frame to observe the portions of the environment determined for each of the plurality of objectives.

The graph illustrated in FIG. 7 may be referred to as a directed acyclic graph. In some embodiments, nodes of the graph may be merged to simplify the graph. In particular, nodes representing identical states or very similar states may be merged to simplify the graph. For example, two or more nodes may be merged when the respective cumulative sets of data of the cumulative lists of features/portions of the environment of each of the two or more nodes are the same. Nodes 720 and 722 may be merged if Set[8] contains the same cumulative set of data as Set[9]. In other words, when there is no difference in the sensor data acquired on a sensor trajectory between nodes 704 and 720 and nodes 704 and 722, nodes 720 and 722 may be merged into a single node (e.g., node 722 may be eliminated).

In another embodiment, two or more nodes might not be merged even when the respective cumulative sets of data of the cumulative lists of features/portions of the environment of each of the two or more nodes are the same. Specifically, other properties of the sensor trajectory associated with reaching each of the two or more nodes may be considered. The properties may include a total distance traveled by the sensor, a number of changes in the direction of rotation of the sensor, and/or other factors that may influence a quality/resolution of the sensor scans along the sensor trajectory.

The series of nodes between node 704 and each of nodes 718-732 may comprise a plurality of candidate sensor trajectories from which a sensor trajectory is selected for the sensor to follow as the vehicle moves along the predetermined path. The corresponding data sets Set[7]-Set[14] may comprise a set of portions of the environment observable by the sensor along the respective sensor trajectories. A sensor trajectory may be selected from the plurality of candidate sensor trajectories represented by nodes 718-732 based on an objective function indicative of at least one parameter associated with the plurality of objectives. Namely, a sensor trajectory may be selected by selecting a node from nodes 718-732 that most closely satisfies the plurality of objectives.

The objective function may be determined by a control system of the vehicle, by the global control system, and/or by a user/operator of the vehicle. The parameters of the objective function may include a number of distinct objects and/or features/portions of the environment visible along a respective candidate sensor trajectory, a number of the portions of the environment determined for each of the plurality of objectives observable along the respective candidate sensor trajectory, a power consumed by the sensor along the respective candidate sensor trajectory, a time for traversing the respective sensor trajectory, and a minimum and/or average resolution of the sensor data acquired along the respective sensor trajectory, among other possibilities.

A sensor trajectory may be selected from the plurality of candidate sensor trajectories that maximizes or minimizes the objective function and/or parameters thereof (e.g., maximizes the number of distinct portions of the environment observed, minimizes a time for traversing the sensor trajectory). In some embodiments, the objective function may be referred to or may include a cost function representing a cost (e.g., time, power) associated with a particular candidate sensor trajectory.

In some examples, the control system may receive a plurality of priority levels corresponding to the plurality of objectives. The objective function may indicate to select a trajectory that maximizes a number of portions of the environment observable by the sensor corresponding to high priority objectives. Alternatively, the objective function may indicate that all of the portions of the environment corresponding to high priority objectives (e.g., obstacle detection) may need to be scanned by the sensor along the sensor trajectory. When a sensor trajectory that satisfies the objective function cannot be found, the predetermined path and/or a speed of the vehicle along the predetermined path may be modified or modulated to allow the sensor to scan the portions of the environment dictated by the objective function.

In other examples, a minimum scan resolution corresponding to portions of the sensor trajectory and/or portions of the environment corresponding to the plurality of tasks may be determined by or provided to the control system of the vehicle. For example, the minimum scan resolution may be based on the priority level associated with each of the plurality of objectives. Alternatively, the minimum scan resolution may be determined for a portion of the environment in response to a prior scan of the portion of the environment providing data insufficient to recognize/identify objects within the portion of the environment. The speed of the vehicle and/or the rotational speed of the sensor may be modulated to provide the sensor with additional time to scan additional portions of the environment and/or perform a more detailed scan of some portions of the environment (e.g., perform a scan while the vehicle and sensor are both stationary to minimize resolution degradation due to movement and vibrations).

In some embodiments, the operations described with respect to FIG. 7 may be expanded to consider one or more sensor parameters in planning and selecting the sensor trajectory. The sensor parameters may be referred to as sensor performance parameters and may include a level of zoom/magnification, frame rate, resolution, image exposure, white balance, and/or gain, among a number of other possible sensor parameters. The sensor performance parameters may be adjusted for each data frame (e.g., image frame) captured by the sensor and may collectively influence or determine a quality of the data frame (e.g., a scan quality).

The quality of data may be measured, for example, based on a level of contrast between an object of interest and surrounding environmental features. High contrast may allow the object of interest (e.g., pallet) to be identified/recognized against the background environment and interpreted to determine the position/orientation of the object with respect to the vehicle. Within examples, quality of data may be defined as the fitness of the data for use in performing a particular operation (e.g., object detection, environmental feature detection, etc.).

The sensor may be configured with a possible range of values or options for each parameter of a plurality of sensor parameters. For example, the level of zoom of the sensor may be adjustable between 1× and 30× in continuous or discrete increments (e.g., increments of 1× may divide the 1× to 30× range into 30 discrete zoom value options, 1×, 2×, 3×, . . . 29×, 30×). Each of the frame rate, resolution, image exposure, white balance, and/or gain may have a similar range of possible values that may be similarly discretized. In some embodiments, there may be a trade-off between two or more parameters. For example, the product of frame rate and image resolution may be restricted by a maximum bandwidth of a processor or data bus. Accordingly, increasing a frame rate of the sensor may be associated with a corresponding decrease in the resolution of images captured by the sensor.

Just as the speed of sensor rotation and/or translation may be limited to a maximum velocity, so may the rate of change of some of the plurality of sensor parameters be limited to maximum values. For example, adjusting the level of zoom of the sensor may involve physically repositioning one or more lenses of the sensor. The movement speed of the lenses may be limited to a maximum speed. Thus, the rate of change of the zoom may likewise be limited to a corresponding maximum value (e.g., the zoom may be incremented by, at most, 1× in the amount of time between time points 700 and 701). Accordingly, depending on the parameters of the sensor at a start time of the predetermined path and maximum rates of adjustment of the parameters, the parameters to which the sensor can be set or adjusted at each of nodes 704-732 may be limited.

In one example, the sensor parameters may be determined and/or adjusted after a sensor trajectory is selected from the plurality of candidate sensor trajectories. Specifically, sensor parameters may be determined for each portion of the environment observable by the sensor along the determined sensor trajectory. The sensor parameters may be determined based on conditions/properties associated with or expected to be associated with portions of the environment observable to the sensor along the selected sensor trajectory. For example, image exposure may be increased for portions of the environment expected to be dark or poorly illuminated (e.g., racks or shelves). Similarly, sensor magnification may be increased to perform a more detailed scan of an object expected to be located near the far limit of the field of view of the sensor. Thus, sensor parameters may be determined that improve or optimize a quality of data collected along the determined sensor trajectory.

In another example, sensor parameters may be determined for each of the plurality of candidate sensor trajectories. A sensor trajectory may be selected from the plurality of candidate sensor trajectories based on the sensor parameters determined for each of the plurality of candidate sensor trajectories. The values to which the sensor parameters may be adjusted at each angular position of a given candidate sensor trajectory may be referred to as candidate sensor parameters. The operations described with respect to FIG. 7 may be expanded to account for the candidate sensor parameters. For example, if the sensor zoom is set to 4× at node 704 and the sensor is limited to a maximum rate of change of 1× between consecutive time steps, then at node 706 the sensor may be adjusted to either 3× zoom or 5× zoom. This may be visually represented by splitting node 706 (as well as the other nodes) into two nodes to represent the 3× zoom and the 5× zoom states.

Thus, in addition to each of nodes 704-732 being associated with a time point and a candidate angular position, each node may also be associated with the possible range of values for each sensor parameter. Namely, for each respective set of portions of the environment observable by the sensor along the respective candidate sensor trajectory, one or more candidate sensor parameters may be determined for scanning the respective set of portions of the environment. Accordingly, a sensor trajectory may be selected from the plurality of candidate sensor trajectories that maximizes a number of distinct objects/features observable along the selected sensor trajectory as well as improves or optimizes the sensor parameters for scanning each of the distinct objects/features (e.g., improves or optimizes a quality of the data/image representing the distinct objects/features). Thus, a probability of identifying/recognizing the distinct object/features and/or an accuracy with which the distinct objects/features are recognized may be increased.

In some embodiments, sensor parameters may be determined and/or adjusted for each frame of data (e.g., each picture taken by a camera). Sensor parameters may be adjusted between consecutive frames to improve or optimize a quality of each frame of data. The quality of data captured by the sensor may be analyzed and used as feedback to adjust sensor parameters for capturing future data frames. In some instances, the frame rate may be sufficient to capture multiple frames of a particular portion of the environment. When capturing the initial data/image frames of the particular portion of the environment, sensor parameters may be set to specific values based on expected conditions/properties and/or expected content of the particular portion of the environment (e.g., the environment may be expected to be dark, expected content may be a fiducial marker, and the fiducial marker may be expected to be located very close to the sensor). For example, the control system may set and/or adjust the sensor parameters based on the sensor parameters determined for each portion of the environment observable along the selected sensor trajectory.

After the initial data frames are acquired, the initial data frames may be analyzed to determine whether the quality of the data is sufficient to recognize the objects/features of interest with a sufficient degree of certainty/accuracy and/or determine a position/orientation of the object/feature with respect to the vehicle. The control system may determine to adjust or update the sensor parameters to improve or optimize a quality of subsequent sensor data frames based on the analysis performed on the initial data frames (e.g., the control system may include a feedback system). For example, the control system may determine that the initial data/image frames are too dark and the object of interest (e.g., fiducial marker) is located too far away from the sensor to accurately recognize. The control system may determine to adjust the parameters of the sensor by increasing a level of zoom/magnification of the sensor, increasing a gain of the sensor, and/or increasing an image exposure of the sensor. Accordingly, subsequent data/image frames may be brighter than the initial data/image frames and may contain sufficient detail to accurately recognize the object of interest.

VII. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   a robotic device;
   a sensor connected to the robotic device, wherein the sensor is configured to move with respect to the robotic device to control a portion of an environment observable by the sensor, and wherein a parameter of the sensor is adjustable to control a quality with which the portion of the environment is scanned by the sensor; and
   a control system configured to:
      determine a sensor trajectory through which to move the sensor with respect to the robotic device while the robotic device moves along a path through the environment, wherein a plurality of portions of the environment are observable by the sensor as the sensor moves along the determined sensor trajectory;
      determine a plurality of candidate sequences of sensor parameter values, wherein each candidate sequence of sensor parameter values defines, for each respective portion of the plurality of portions of the environment, a candidate sensor parameter value to which the parameter of the sensor is adjustable when the sensor scans the respective portion of the environment;
      select, from the plurality of candidate sequences of sensor parameter values a sequence of sensor parameter values that defines, for each respective portion of the plurality of portions of the environment, a sensor parameter value with which to scan the respective portion of the environment based on an objective for which the respective portion of the environment is scanned; and
      as the sensor moves along the sensor trajectory, adjust the parameter of the sensor to scan each portion of the plurality of portions of the environment according to the selected sequence of sensor parameter values.

2. The system of claim 1, wherein the control system is configured to determine each candidate sequence of sensor parameter values of the plurality of candidate sequences of sensor parameter values by:
   determining, for each respective portion of the environment, the candidate sensor parameter value based on (i) a candidate sensor parameter value determined for a prior portion of the environment preceding the respective portion of the environment along the determined sensor trajectory and (ii) a rate at which the parameter of the sensor is adjustable.

3. The system of claim 1, wherein the control system is configured to determine the plurality of candidate sequences of sensor parameter values by:
   determining a plurality of time points along the path, wherein each time point of the plurality of time points corresponds to a different position of the robotic device along the path;
   for each time point of the plurality of time points, determining a plurality of candidate sensor parameter values based on (i) a rate at which the parameter of the sensor is adjustable and (ii) one or more candidate sensor parameter values at a prior time point; and
   determining the plurality of candidate sequences of sensor parameter values by selecting, for each time point of the plurality of time points, a corresponding sensor parameter value from the plurality of candidate sensor parameter values.

4. The system of claim 3, wherein each time point of the plurality of time points is associated with a corresponding portion of the environment of the plurality of portions of the environment that are observable by the sensor as the sensor moves along the determined sensor trajectory.

5. The system of claim 1, wherein the control system is configured to select the sequence of sensor parameter values by:
   selecting a first sensor parameter value for the respective portion of the environment from a plurality of candidate sensor parameter values defined for the respective portion of the environment by the plurality of candidate sequences of sensor parameter values; and
   selecting, based on the first sensor parameter value, a second sensor parameter value for a successive portion of the environment subsequent to the respective portion of the environment such that the parameter of the sensor is adjustable from the first sensor parameter value to the second sensor parameter value between respective scans of the respective portion of the environment and the successive portion of the environment.

6. The system of claim 1, wherein the control system is further configured to:
determine a plurality of objectives for which to collect sensor data as the robotic device moves along the path through the environment, wherein each respective portion of the plurality of portions of the environment is scanned to collect sensor data for one or more objectives of the plurality of determined objectives.

7. The system of claim 6, wherein the control system is further configured to:
determine a plurality of priority levels corresponding to the plurality of objectives; and
select, from the plurality of candidate sequences of sensor parameter values, the sequence of sensor parameter values based on the corresponding priority level of the one or more objectives for which the respective portion of the environment is scanned.

8. The system of claim 6, wherein the plurality of objectives comprise two or more of (i) detection of obstacles on the path through the environment, (ii) localization of the robotic device within the environment, and (iii) detection of objects of interests in regions of the environment adjacent to the path through the environment.

9. The system of claim 1, wherein the control system is further configured to:
determine, for each respective portion of the plurality of portions of the environment, conditions expected to be associated with the respective portion of the environment; and
select the sequence of sensor parameter values that defines the sensor parameter value with which to scan the respective portion of the environment based on the conditions expected to be associated with the respective portion of the environment.

10. The system of claim 1, wherein the control system is further configured to:
determine, for each respective portion of the plurality of portions of the environment, expected content of the respective portion of the environment; and
select the sequence of sensor parameter values that defines the sensor parameter value with which to scan the respective portion of the environment based on the expected content of the respective portion of the environment.

11. The system of claim 1, wherein the parameter of the sensor comprise one or more of (i) a level of magnification of the sensor, (ii) a level of gain of the sensor, (iii) an exposure time of the sensor, (iv) a frame rate at which the sensor generates sensor data, (v) a resolution of the sensor, or (vi) a white balance of the sensor.

12. The system of claim 1, wherein the objective for which the respective portion of the environment is scanned is associated with a quality of sensor data, and wherein the control system is configured to select the sequence of sensor parameter values that defines the sensor parameter value with which to scan the respective portion of the environment based on the quality of sensor data associated with the respective portion of the environment.

13. The system of claim 1, wherein the control system is configured to determine the sensor trajectory by:
determining a plurality of candidate sensor trajectories; and
selecting, based on the plurality of portions of the environment to be scanned while the robotic device moves along the path through the environment, the sensor trajectory from the plurality of candidate sensor trajectories.

14. A method comprising:
determining, by a control system, a sensor trajectory through which to move a sensor with respect to a robotic device while the robotic device moves along a path through an environment, wherein the sensor is connected to the robotic device and configured to move with respect to the robotic device to control a portion of the environment observable by the sensor, wherein a plurality of portions of the environment are observable by the sensor as the sensor moves along the determined sensor trajectory, and wherein a parameter of the sensor is adjustable to control a quality with which the portion of the environment is scanned by the sensor;
determining, by the control system, a plurality of candidate sequences of sensor parameter values, wherein each candidate sequence of sensor parameter values defines, for each respective portion of the plurality of portions of the environment, a candidate sensor parameter value to which the parameter of the sensor is adjustable when the sensor scans the respective portion of the environment;
selecting, by the control system, from the plurality of candidate sequences of sensor parameter values, a sequence of sensor parameter values that defines, for each respective portion of the plurality of portions of the environment, a sensor parameter value with which to scan the respective portion of the environment based on an objective for which the respective portion of the environment is scanned; and
as the sensor moves along the sensor trajectory, adjusting, by the control system, the parameter of the sensor to scan each portion of the plurality of portions of the environment according to the selected sequence of sensor parameter values.

15. The method of claim 14, wherein determining each candidate sequence of sensor parameter values of the plurality of candidate sequences of sensor parameter values comprises:
determining, for each respective portion of the environment, the candidate sensor parameter value based on (i) a candidate sensor parameter value determined for a prior portion of the environment preceding the respective portion of the environment along the determined sensor trajectory and (ii) a rate at which the parameter of the sensor is adjustable.

16. The method of claim 14, wherein determining the plurality of candidate sequences of sensor parameter values comprises:
determining a plurality of time points along the path, wherein each time point of the plurality of time points corresponds to a different position of the robotic device along the path;
for each time point of the plurality of time points, determining a plurality of candidate sensor parameter values based on (i) a rate at which the parameter of the sensor is adjustable and (ii) one or more candidate sensor parameter values at a prior time point; and
determining the plurality of candidate sequences of sensor parameter values by selecting, for each time point of the plurality of time points, a corresponding sensor parameter value from the plurality of candidate sensor parameter values.

17. The method of claim 14, further comprising:
determining a plurality of objectives for which to collect sensor data as the robotic device moves along the path through the environment, wherein each respective portion of the plurality of portions of the environment is scanned to collect sensor data for one or more of the plurality of determined objectives.

18. A non-transitory computer readable storage medium having stored thereon instructions that, when executed by a computing device, cause the computing device to perform operations comprising:
determining a sensor trajectory through which to move a sensor with respect to a robotic device while the robotic device moves along a path through an environment, wherein the sensor is connected to the robotic device and configured to move with respect to the robotic device to control a portion of the environment observable by the sensor, wherein a plurality of portions of the environment are observable by the sensor as the sensor moves along the determined sensor trajectory, and wherein a parameter of the sensor is adjustable to control a quality with which the portion of the environment is scanned by the sensor;
determining a plurality of candidate sequences of sensor parameter values, wherein each candidate sequence of sensor parameter values defines, for each respective portion of the plurality of portions of the environment, a candidate sensor parameter value to which the parameter of the sensor is adjustable when the sensor scans the respective portion of the environment;
selecting, from the plurality of candidate sequences of sensor parameter values, a sequence of sensor parameter values that defines, for each respective portion of the plurality of portions of the environment, a sensor parameter value with which to scan the respective portion of the environment based on an objective for which the respective portion of the environment is scanned; and
as the sensor moves along the sensor trajectory, adjusting the parameter of the sensor to scan each portion of the plurality of portions of the environment according to the selected sequence of sensor parameter values.

19. The non-transitory computer readable storage medium of claim 18, wherein determining each candidate sequence of sensor parameter values of the plurality of candidate sequences of sensor parameter values comprises:
determining, for each respective portion of the environment, the candidate sensor parameter value based on (i) a candidate sensor parameter value determined for a prior portion of the environment preceding the respective portion of the environment along the determined sensor trajectory and (ii) a rate at which the parameter of the sensor is adjustable.

20. The non-transitory computer readable storage medium of claim 18, wherein determining the plurality of candidate sequences of sensor parameter values comprises:
determining a plurality of time points along the path, wherein each time point of the plurality of time points corresponds to a different position of the robotic device along the path;
for each time point of the plurality of time points, determining a plurality of candidate sensor parameter values based on (i) a rate at which the parameter of the sensor is adjustable and (ii) one or more candidate sensor parameter values at a prior time point; and
determining the plurality of candidate sequences of the sensor parameter values by selecting, for each time point of the plurality of time points, a corresponding sensor parameter value from the plurality of candidate sensor parameter values.

* * * * *